US009536359B1

(12) United States Patent
Gokcebay

(10) Patent No.: US 9,536,359 B1
(45) Date of Patent: Jan. 3, 2017

(54) DELIVERY SYSTEM VIA ELECTRONIC LOCKBOXES

(71) Applicant: Digilock Asia Ltd., Kowloon (HK)

(72) Inventor: Asil T. Gokcebay, Petaluma, CA (US)

(73) Assignee: Digilock Asia Ltd., Kowloon (HK)

( * ) Notice: Subject to any disclaimer, the term of this patent is extended or adjusted under 35 U.S.C. 154(b) by 0 days.

(21) Appl. No.: 15/058,097

(22) Filed: Mar. 1, 2016

Related U.S. Application Data

(63) Continuation-in-part of application No. 14/252,647, filed on Apr. 14, 2014, now Pat. No. 9,273,492, which is a continuation-in-part of application No. 13/945,695, filed on Jul. 18, 2013, now Pat. No. 9,208,628, which is a continuation-in-part of application No. 12/214,357, filed on Jun. 17, 2008, now Pat. No. 8,490,443, and a continuation-in-part of application No. 11/809,172, filed on May 30, 2007, now Pat. No. 8,495,898.

(60) Provisional application No. 60/810,195, filed on May 31, 2006.

(51) Int. Cl.
*G05B 19/00* (2006.01)
*G07C 9/00* (2006.01)
*E05B 47/00* (2006.01)

(52) U.S. Cl.
CPC ....... *G07C 9/00007* (2013.01); *G07C 9/00309* (2013.01); *E05B 2047/0048* (2013.01); *G07C 2009/00769* (2013.01)

(58) Field of Classification Search
CPC ............ G07C 9/00007; G07C 9/00309; G07C 2009/00769; G07C 2009/00793; G07C 2209/63; G07C 9/00111; B60R 25/24
USPC ....................................... 340/5.2, 5.61, 5.73
See application file for complete search history.

(56) References Cited

U.S. PATENT DOCUMENTS

| | | | |
|---|---|---|---|
| 2,046,630 | A | 7/1936 | Jacobi |
| 3,455,127 | A | 7/1969 | Simon |
| 3,753,164 | A | 8/1973 | DeVries |
| 3,754,164 | A | 8/1973 | Zorzy |
| 3,754,213 | A | 8/1973 | Morroni et al. |
| 3,831,065 | A | 8/1974 | Martin et al. |
| 3,878,511 | A | 4/1975 | Wagner |
| 4,243,256 | A | 1/1981 | Frydrych |
| 4,495,540 | A | 1/1985 | Remington et al. |
| 4,568,998 | A | 2/1986 | Kristy |
| 4,665,397 | A | 5/1987 | Pinnow |
| 4,748,833 | A | 6/1988 | Nagasawa |
| 4,887,445 | A | 12/1989 | Beatty |

(Continued)

FOREIGN PATENT DOCUMENTS

| | | |
|---|---|---|
| EP | 0721036 | 7/1996 |
| EP | 1178167 | 2/2002 |
| GB | 2309732 A | 8/1997 |

*Primary Examiner* — Omer S Khan
(74) *Attorney, Agent, or Firm* — Thomas M. Freiburger

(57) ABSTRACT

A cam lock for cabinets, drawers, drug cabinets, credenzas, sliding doors, lockers, mail boxes and other door type applications is compact in size, fits an existing cam lock opening and provides electronic access via a keypad or other electronic access. In a particular embodiment the lock is long, narrow and low in profile so as to fit on the margin of a steel or wood file cabinet, compatible with the cam lock opening already provided. The lock can be on a secure delivery box of each of a series of customers, in a system for secure delivery and pickup of the goods as ordered by the customers.

2 Claims, 29 Drawing Sheets

(56) References Cited

U.S. PATENT DOCUMENTS

| | | | |
|---|---|---|---|
| 4,901,545 | A | 2/1990 | Bacon et al. |
| 4,931,789 | A | 6/1990 | Pinnow |
| 4,956,984 | A | 9/1990 | Chi-Cheng |
| 4,967,305 | A | 10/1990 | Murrer et al. |
| 5,020,345 | A | 6/1991 | Gartner et al. |
| 5,021,776 | A | 6/1991 | Anderson et al. |
| 5,033,282 | A | 7/1991 | Gartner et al. |
| 5,153,561 | A | 10/1992 | Johnson |
| 5,223,829 | A | 6/1993 | Watabe |
| 5,321,963 | A | 6/1994 | Goldman |
| 5,373,718 | A | 12/1994 | Schwerdt et al. |
| 5,461,218 | A | 10/1995 | Castleman et al. |
| 5,564,294 | A | 10/1996 | Chen |
| 5,774,053 | A | 6/1998 | Porter |
| 5,845,523 | A | 12/1998 | Butterweck et al. |
| 5,886,644 | A | 3/1999 | Keskin et al. |
| 5,894,277 | A | 4/1999 | Keskin et al. |
| 6,089,058 | A | 7/2000 | Elpern et al. |
| 6,116,066 | A | 9/2000 | Gartner et al. |
| 6,209,367 | B1 | 4/2001 | Hyatt, Jr. et al. |
| 6,331,812 | B1 | 12/2001 | Dawalibi |
| 6,347,486 | B1 | 2/2002 | Badillet |
| 6,378,344 | B1 | 4/2002 | Gartner |
| 6,384,711 | B1 | 5/2002 | Cregger et al. |
| 6,640,594 | B1 | 11/2003 | Yao |
| 6,655,180 | B2 | 12/2003 | Gokcebay et al. |
| 6,708,538 | B1 | 3/2004 | Walby |
| 6,791,450 | B2 | 9/2004 | Gokcebay et al. |
| 6,989,732 | B2 | 1/2006 | Fisher |
| D520,340 | S | 5/2006 | Freck |
| 7,151,434 | B2 | 12/2006 | Mayer et al. |
| 7,336,150 | B2 | 2/2008 | Gokcebay et al. |
| 7,469,564 | B1 | 12/2008 | Shaw |
| 7,516,633 | B1 | 4/2009 | Chang |
| 8,490,443 | B2 | 7/2013 | Gokcebay |
| 8,495,898 | B2 | 7/2013 | Gokcebay |
| 9,273,492 | B2 | 3/2016 | Gokcebay |
| 2004/0243426 | A1* | 12/2004 | Hashimoto .......... A47G 29/141 232/20 |
| 2005/0050928 | A1 | 3/2005 | Frolov et al. |
| 2005/0179517 | A1 | 8/2005 | Harms et al. |
| 2006/0065027 | A1 | 3/2006 | Valentine |
| 2006/0076385 | A1 | 4/2006 | Etter et al. |
| 2006/0150694 | A1 | 7/2006 | Frolov et al. |
| 2007/0056339 | A1 | 3/2007 | Irgens et al. |
| 2007/0090921 | A1 | 4/2007 | Fisher |
| 2007/0169525 | A1 | 7/2007 | Chang |
| 2009/0115196 | A1 | 5/2009 | Stango |
| 2011/0053557 | A1* | 3/2011 | Despain ................. A47G 29/10 455/410 |
| 2012/0077431 | A1 | 3/2012 | Fyke et al. |
| 2013/0166067 | A1 | 6/2013 | Irwin et al. |
| 2014/0035721 | A1 | 2/2014 | Heppe et al. |
| 2015/0106296 | A1* | 4/2015 | Robinson ................ G06F 21/62 705/339 |

* cited by examiner

Global Delivery System

DELIVERY SYSTEM VIA ELECTRONIC LOCKBOXES

This application is a continuation-in-part of application Ser. No. 14/252,647, filed Apr. 14, 2014, now U.S. Pat. No. 9,273,492, which was a continuation-in-part of application Ser. No. 13/945,695, filed Jul. 18, 2013, which was a continuation-in-part of two prior applications: Ser. No. 11/809,172, filed May 30, 2007, now U.S. Pat. No. 8,495,898, and Ser. No. 12/214,357, filed Jun. 17, 2008, now U.S. Pat. No. 8,490,443. Ser. No. 13/945,695 fully incorporated by reference all of the content of U.S. Pat. Nos. 8,495,898 and 8,490,443, which content is repeated and incorporated here. All content of application Ser. No. 13/945,695 is incorporated by reference here. Application Ser. No. 11/809,172 claimed benefit from provisional application No. 60/810,195, filed May 31, 2006.

BACKGROUND OF THE INVENTION

This invention concerns locks for cabinets, lockers, drawers, access panels and similar situations. Specifically the invention embraces an electronic cam lock that fits standard cam lock openings.

Metal and wood file cabinets, desk and cabinet drawers, locker doors, access panels and doors, mail boxes, dispensers and other secure situations often utilize relatively simple lock mechanisms known as cam locks. Such cam locks may or may not involve a camming action. In some cases they move other mechanisms that are engaged with the door or drawer of the cabinet or engaged with other mechanisms that are linked to the door and drawer of the cabinet or multiple doors or drawers of the cabinet. In one of the simplest forms, a cam lock on a cabinet door typically fits in a ¾ inch diameter D-shaped or double D-shaped hole and, at the back side of the cam lock cylinder unit, has a metal blade or arm called a cam that rotates when the key is turned, from a position disengaged from surrounding cabinet hardware to a position of engagement in a slot or behind a ledge of the surrounding cabinet hardware. Other locks, such as those for desk drawers, commonly referred as cabinet locks, involve a camming type action as the key and plug are rotated. The rotation causes a cam or nipple to move a deadbolt linearly to a locking or unlocking position or in the case of a spring loaded latch or deadlatch the rotation causes the cam or nipple to move a latch or deadlatch to unlocking position and removing the key keeps the latch or deadlatch in the extended locked position.

Metal filing cabinets often utilize cam locks, or a variation known as a plunger type lock in which a spring loaded plunger/lock cylinder located in the top horizontal margin of the cabinet, when pushed in, will lock all drawers. The use of a key releases the spring plunger to return to the outward position and unlock the drawers.

Locker and cabinet locks have included electronic locking devices, some of which utilized keypads and some of which utilized IButtons or other ID or non-volatile memory devices which work on contact to release the lock. See, for example, U.S. Pat. Nos. 5,894,277, 5,886,644, 6,655,180 and 6,791,450. The disclosures of all of these patents are incorporated herein by reference.

There is a need for a relatively simple, easily used, reliable and compact electronic lock, preferably a keypad lock but optionally operable by an electronic key, or both, for situations in which typically cam, plunger and cabinet locks were employed, and capable of fitting in a standard opening or bore of a standard cam, plunger or cabinet lock cylinder in a cabinet, door, access panel, mail box, dispenser, etc. and alternatively capable of fitting in a standard shell of a standard cam, plunger or cabinet lock cylinder in a cabinet, door, access panel, mail box, dispenser, etc. This is an objective of the current invention described below.

SUMMARY OF THE INVENTION

The invention addresses these needs with a low profile and very compact electronic lock that, in one application, fits in the top one inch horizontal margin of a steel file cabinet (or a side vertical margin). The compact electronic locking device in one embodiment has a knob or handle that can rotate the cam lock cylinder plug when such manual rotation is permitted by the lock electronics. A keypad for entry of a code may be included, and if so, the code in preferred embodiments can be either permanently set to a reprogrammable code, or set in each case by a temporary user, who can then input the same code to lock and unlock the lock, this feature depending on circumstances and function desired.

In one preferred embodiment particularly adapted for a file cabinet, the locking device is less than one inch in height, about two inches in length for one form, about three to five inches for another form, and about ⅜ to ¾ inch in depth or more preferably no more than about ⅝ inch or less in depth, as to the housing of the device. A cam locking device of this size will fit unobtrusively on the surface of the horizontal top margin area of a steel file cabinet. The housing may contain several small battery cells, such as two AAA batteries, but preferably smaller batteries such as coin cell or button-type batteries for further reduction of housing size. From the back of the housing in one embodiment extends the cam lock cylinder unit of conventional cam lock size, and with a length to fit the application, i.e. the depth of material and configuration where mounted. The rear-extending cylinder unit may have an external thread, so that a nut or threaded ring is tightened down to firmly retain the cylinder and housing in place. In other embodiments a dummy plug can extend back from the housing unit, or simply a driver or spindle. Since the cam lock opening in the cabinet or door or panel will typically be the conventional D-shaped opening or double D-shaped opening, the housing is fixed in place against rotation by this configuration. However, another fastening location(s) may be included, such as a machine screw assembled from the back and through a hole in the drawer or panel, engaging in a threaded hole provided in the housing, or screw posts extending from the back of the housing. This threaded hole or screw post preferably is at an opposite end of the housing from the location of the cylinder and turning knob or handle. There may be more than one threaded hole or screw post depending on the mounting preferences. In an alternative configuration, the housing back can simply have a nipple that extends in a hole formed in the cabinet, drawer or door, or a hook-shaped element that extends from the back of the housing and engages firmly in the hole, particularly for relatively thin metal cabinets.

It is an important feature of the invention that the electronic cam lock device be compact and relatively simple, at least as to mechanical elements, and without any further electronics or housing required at the back side of the door or panel. Essentially the only element at the back side of the door, drawer or panel is the rear-extending cam lock cylinder unit itself, with attached cam positioned to engage with a ledge or slot or other hardware to retain the door(s) or panel locked. In some embodiments the rear-extending element is a dummy plug or driver. An alternative form of the lock still comprises a single housing but is positioned at the back side of the panel, drawer, etc., in a through-the-panel mounting with only the knob or handle and the access terminal or keypad extending through the panel.

In one preferred form, the invention is embodied in a cam lock for a door, cabinet or drawer and includes a compact housing containing electronics and having a keypad or other terminal enabling entry of codes by a user, a cam cylinder unit or driver extending from a back side of the housing, in a standard cam lock size adapted to fit through a standard cam lock opening in a cabinet or door for extending therethrough, and with a knob or handle on the housing for operating the cam lock manually when permitted by the electronics. A battery compartment in the housing, accessible from the front of the cabinet, contains one or more battery cells for operating the electronics.

In another preferred form, the invention is embodied in a cam lock for a door, cabinet or drawer and includes a compact housing containing electronics and having a keypad or other terminal enabling entry of codes by a user, a plug of the cam, plunger or cabinet lock cylinder unit extending from a back side of the housing that matches the size and shape of the cam lock shell already mounted on the door, cabinet or drawer, and with a knob or handle on the housing for operating the cam lock manually when permitted by the electronics. Again, a battery compartment in the housing, accessible from the front of the cabinet, contains one or more battery cells for operating the electronics.

In another preferred form, the invention is embodied in a cam lock for a door, cabinet or drawer and includes a compact housing containing electronics and having a keypad or other terminal enabling entry of codes by a user, a special shaped driver unit extending from a back side of the housing that matches an opening on the plug of the cam cabinet or drawer, a lock shell already mounted on the door, and with a knob or handle on the housing for operating the cam lock manually when permitted by the electronics. Again, a battery compartment in the housing, accessible from the front of the cabinet, contains one or more battery cells for operating the electronics.

In another preferred form, the invention is embodied in a cam lock for a door, cabinet or drawer mountable from back of the door, cabinet or drawer such that only the user interface extends through the face of the door, cabinet or drawer and includes a compact housing containing electronics and having an electronic key receptacle and in some cases, a keypad for entry of codes by a user, a specially shaped driver unit extending from a back side of the housing that matches the end of a cam lock or cam lock plug of the typical mechanical lock for engaging with a strike or other locking bars, cams or apparatus, and with a knob or handle on the housing for operating the cam lock manually when permitted by the electronics. A battery compartment in the housing, accessible from the back of the lock, contains one or more battery cells for operating the electronics.

In another preferred form, the invention is embodied in a cam lock for a door, cabinet or drawer mountable from back of the door, cabinet or drawer such that only the user interface extends through the face of the door, cabinet or drawer and includes a compact housing containing electronics and having an electronic key receptacle and an RF reader or wireless reader or IButton reader for entry of a code by a user, a specially shaped driver unit extending from a back side of the housing that matches the end of a cam lock or cam lock plug of the typical mechanical lock for engaging with a strike or other locking bars, cams or apparatus, and with a knob or handle on the housing for operating the cam lock manually when permitted by the electronics.

In another preferred form the lock devices are fitted with an RJ45 jack or wireless antenna for network connectivity and external power. The locks may be fitted for NFC communication.

It is therefore among the objects of the invention to improve over prior cam and cabinet locks, with an electronic cam lock that can be retrofitted to existing cam lock and cabinet lock openings in doors, drawers, access panels, mail boxes, dispensers, and other furniture that provides access and no egress without a mechanical key, as well as to provide an improved locking solution for new applications wherein the internal locking systems for locking multiple points are configured to receive a cam, plunger or cabinet lock. The device is relatively simple, compact and unobtrusive. These and other objects, advantages and features of the invention will be apparent from the following description of preferred embodiments, considered along with the accompanying drawings.

DESCRIPTION OF PREFERRED EMBODIMENTS

Figure 1:
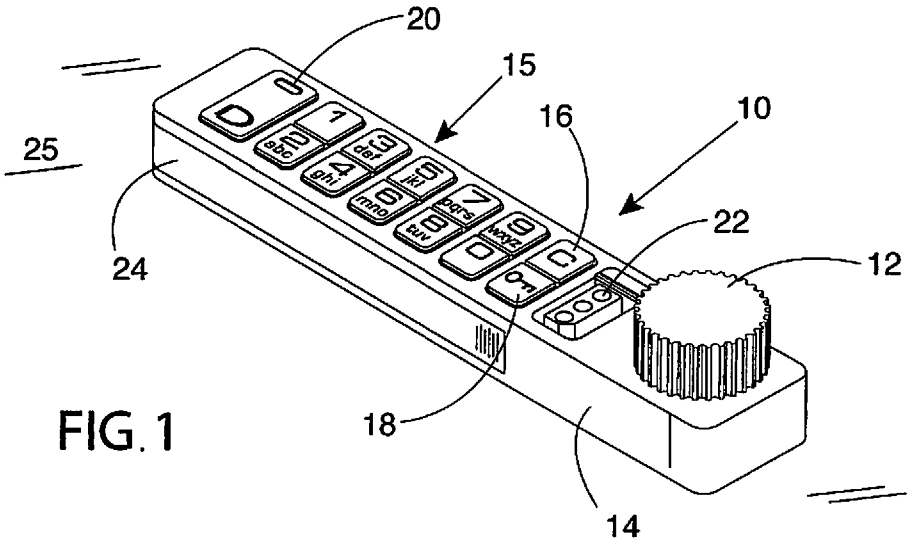
FIG. 1 is a perspective view showing an electronic cam lock device of the invention.

FIG. 1 shows an electronic cam lock 10, in a preferred form of a keypad cam lock, with a rotatable knob or handle 12 extending from a housing 14. A keypad 15 is exposed at the front of the housing to allow entry of a code, using the usual numerical digits 1 to 0 and/or letters of the alphabet, as illustrated. The keypad preferably includes a "clear" button 16 and an "enter" button 18, the latter shown with a key symbol in the drawing. The lock can be programmed such that the enter button is pushed as the last button in all code entries, thus enabling different numbers of digits for different purposes, as well as some other functions. However, the lock can be programmed otherwise if desired, such as being programmed to operate after a designated number of valid key strokes. A status LED is included at 20; this can show locked/unlocked states as well as battery status.

At 22 is shown a recess or connection with a plurality of electrical contacts, preferably three as shown. This can be for several purposes, including providing "jump" power in the event of battery failure, and use of an electronic master key for entry of a master code by contact with this connection, when a key code to which the device is set has been forgotten or lost. As in U.S. Pat. No. 7,336,150, which is incorporated herein by reference, this set of contacts 22 can be connected to receive both jump power and a master code simultaneously (or either one, or both separately).

Batteries are contained within the housing 14. In the embodiment shown, a slide door 24 connects with the housing to close a battery compartment which may be, for example, for two AAA battery cells. The slide door 24 may be locked against sliding whenever the cam lock device is in the locked configuration, such as by a slide pin driven by turning of the cylinder plug. This prevents unauthorized removal of batteries or tampering with the interior of the electronic lock. The door 24 may be hinged rather than slidable, or secured by a screw, which can be a security screw. The unauthorized opening may also be prevented by incorporating a single or multi-point press-to-release lock that requires a special tool for opening the battery compartment.

In FIG. 1 the lock device 10 is shown as secured on a surface or panel 25. The word "panel" is sometimes used herein and in the claims to refer to the component or surface to which the lock is secured, whether the panel is a drawer front, or margin area above, below or to the side of the drawer front, a cabinet door or margin, an access panel or adjacent structure, etc.

Figure 5:
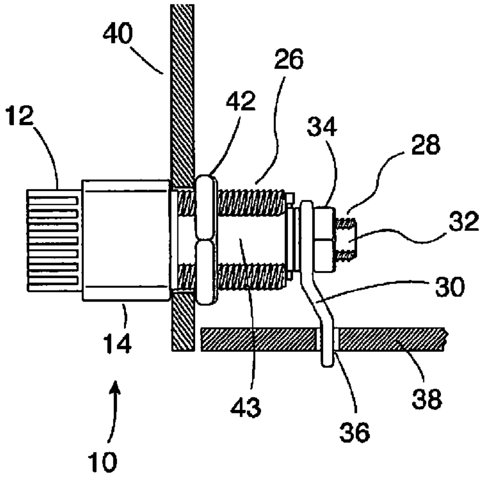
FIG. 5 is a view similar to FIG. 4, but showing the device in a locked position for a drawer, panel or door.
Figure 4:
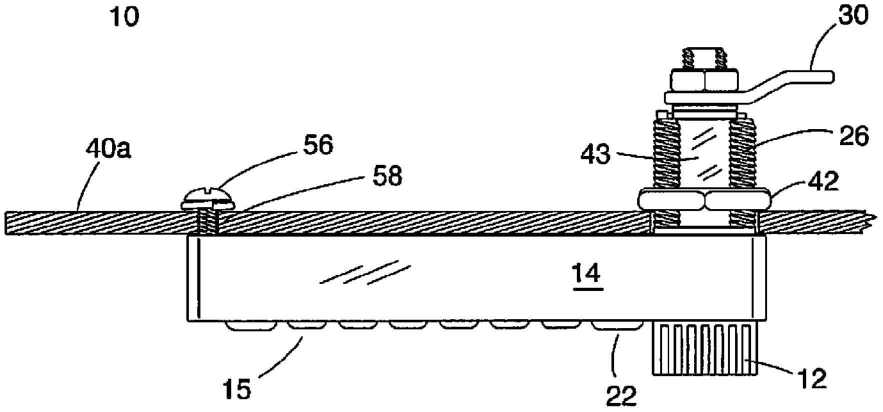
FIG. 4 is a sectional plan view showing the electronic cam lock device as installed, in one preferred manner of installation, on a cabinet or door.
Figure 3:
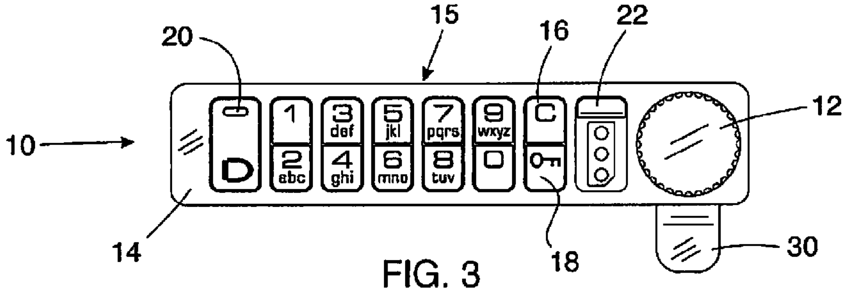
FIG. 3 is an elevation view showing the front of the device.

FIG. 3 is a frontal view of the lock device, and FIGS. 4 and 5 show that the handle or knob 12 connects directly with a cam lock cylinder unit 26, and specifically the handle 12 turns with a movable member, e.g. rotatable bolt or core 28 which rotates within the fixed cylinder unit 26 when permitted by the electronics. FIG. 5 is a side view of the lock device, generally as seen from the right side of FIG. 1 or FIG. 3 and showing one example of latching. Note that the cylinder unit's bolt or core 28 can be extended as needed, such as for a wood drawer, panel, etc.

Figure 23:
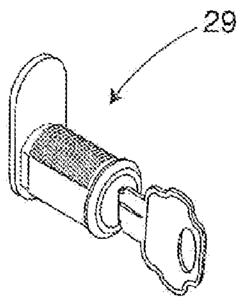
FIG. 23 (PRIOR ART)
FIG. 23 shows a typical prior art mechanical key-operated cam lock.

FIG. 23 shows a typical, simple prior art cam lock 29, of a type which can be replaced by the electronic cam lock unit 10.

The rotatable plug 28 of the cam lock cylinder unit 26 (FIGS. 3-5) is shown fixed to a metal arm or cam 30 as this actuator is typically called. The cam is secured on the plug or rotatable member 28 via a flat 32 on the rotatable plug member and a corresponding hole in the cam (hole not shown), so that the cam is fixed against relative rotation on the plug. Further, the end of the plug is threaded and a nut 34 is tightened down for retention.

Figure 2:
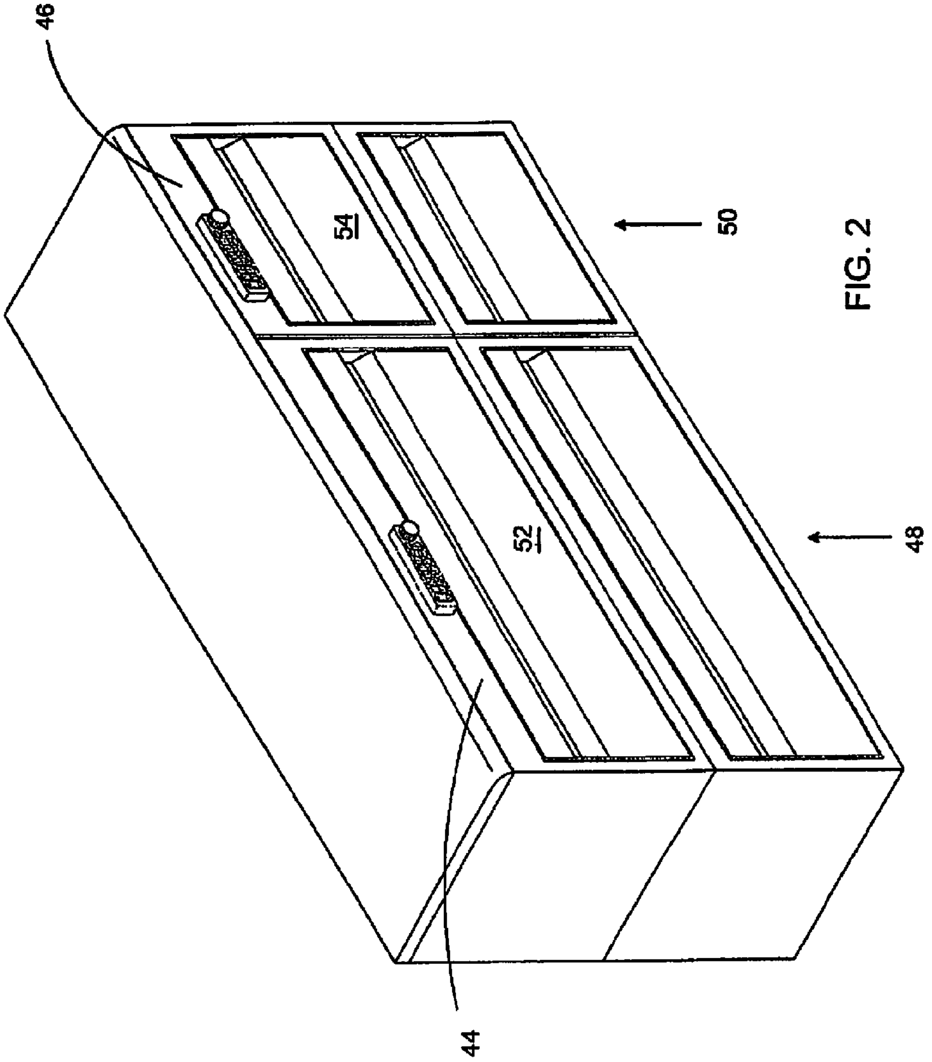
FIG. 2 is a view showing the device on a metal file cabinet.

FIG. 5 shows the cam 30, which can be in a bent offset shape as shown or can be any other desired configuration (a multiplicity of different cam shapes are available), engaged in a slot 36 in a structure 38 adjacent to a panel 40 to which the cam lock device is secured, via a nut or threaded ring 42. A flat 43 on the cylinder 26 matches the D configuration, or two opposed such flats can be included. Thus, the panel 40 may be a drawer to be pulled outwardly from the structure 38 when the lock is unlocked, or a door or cabinet or access panel. Similarly the lock device 10 can be installed in a panel of a fixed structure, such as the two locks shown as secured to the top margin areas of 44 and 46 in two adjacent banks of file drawers or file cabinets 48 and 50 in FIG. 2. In that case a cam can engage downwardly against a ledge or into a slot in the adjacent file drawer 52 or 54 when locked, preventing the pulling out of a drawer, or a more complex mechanical arrangement can be included, typical of such lateral file cabinets, whereby the lock either holds a locking mechanism in place for both drawers, or the locking of the top drawer effects the locking of the lower drawer as well, through a well-known form of mechanical interlinkage.

Figure 1A:
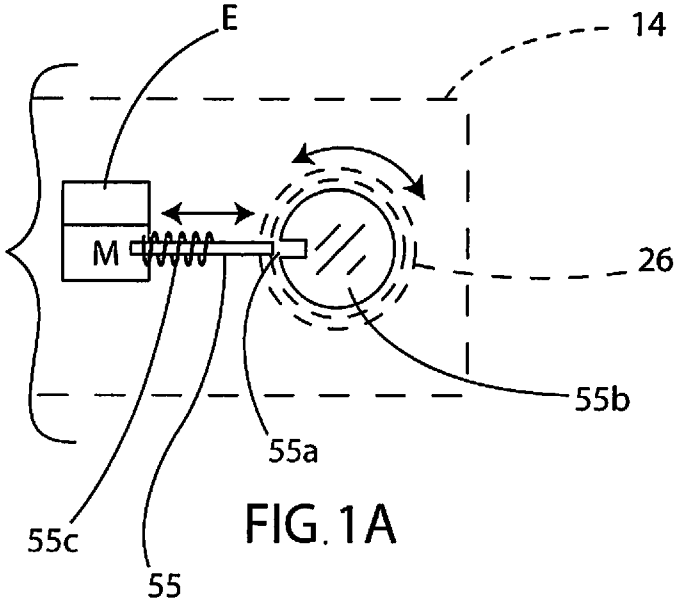
FIG. 1A is a schematic view showing a feature internal to the cam lock.

In a simple cam lock arrangement such as shown in FIGS. 3, 4 and 5, and referring to the simplified schematic view of FIG. 1A, the electronics (not shown but indicated at E in FIG. 1A) within the lock housing 14 can include or be connected to a slidable pin 55 driven by an electrically operated device, i.e. a solenoid or miniature motor M, for engaging the pin with a notch 55*a* in the internal rotatable member 55*b* leading from the handle or knob 12 to the rear-extending bolt 32, to prevent rotation. The pin may be urged toward the notch by a spring 55*c*. The electronics can be similar to those disclosed in any of the above patents incorporated herein by reference. PIN code actuated electronics are well known to those skilled in the art, and, when an appropriate code is entered using the keypad, the electronics will connect power to the motor or solenoid, or other electronic device to momentarily retract the blocking pin from such a notch in the rotatable member. If a solenoid is used it is biased to be normally urged into engagement with the notch whenever the notch is located in the appropriate position. If desired the lock can be set up to simply leave the notch out of contact with the biased pin when the knob has been rotated to unlock the cam lock device. The drawer or door or panel can thus be left with the lock in this state during working hours or during any period desired, until the user wishes to secure the drawer or door again. At that point, the user rotates the knob or handle until a "click" is felt, when the pin has re-engaged in the notch to lock the knob against further turning. A motor can also operate the pin with spring linkage.

An alternative arrangement is to have the cam lock cylinder unit define two different positions in which its movement is blocked. In this case, two notches (not shown, but second notch similar to 55*a* in FIG. 1A but at different rotational position) are provided in the internal rotatable member, one for locking the door or drawer and one for holding the knob and cam in a fully unlocked position, and in this situation a code must be entered in order to return the lock to the locked position.

Figure 4A:
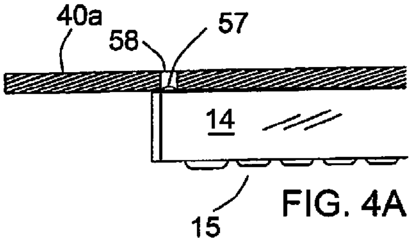
FIG. 4A is a sectional view showing a variation of what is shown in FIG. 4.

Although the cam lock device 10 can be securely retained on a door front panel or metal file cabinet panel or other door, drawer or access panel using the threaded cam lock cylinder unit 26 with the tightened nut 42 and the registry provided by the D or double D-shaped cam lock cylinder and opening typical of cam locks (see flat 43 shown in FIGS. 4 and 5), the installation may include an attachment at the other end of the lock housing, i.e. the end opposite where the handle or knob 12 is located (left side in FIG. 3). In FIG. 4 is shown a machine screw 56 that passes through a hole 58 in the panel 40*a*, tightened into a threaded opening in the housing 14. This will require drilling of a small hole, approximately ⅛ inch diameter, through the panel. Alternatively, the back of the housing 14 can simply have a nipple 57 that extends into the hole 58 (as indicated in FIG. 4A), or a hooked nipple, generally L-shaped, which is extended such that the leg of the L-shape goes through the hole to the back of the panel, then the housing is pivoted down against the panel until the cam lock cylinder unit 26 passes through the cam lock hole in the cabinet or panel.

An important feature of the invention is that the keypad-operated electronic cam lock device 10 includes no housing or electronic components at the inside of a door or drawer or panel. The only structure of the lock device extending into the interior or back side of the panel on which attached is the cam lock cylinder unit 26 and, optionally, a threaded fastener or machine bolt 56. This makes the unit of the invention compatible with situations in which nearly all cam locks are used, since those simple prior art key-operated devices typically comprise a rotatable plug for receiving the mechanical key, a cam lock cylinder shell with a front face plate, and a tail on the plug which has the cam affixed to the tail. Access can be difficult at the inside of a cabinet, and the avoidance of any inner housing or electronics (such as included in the some of the locker locks disclosed in the patents referenced above) is an important feature.

Figure 24:
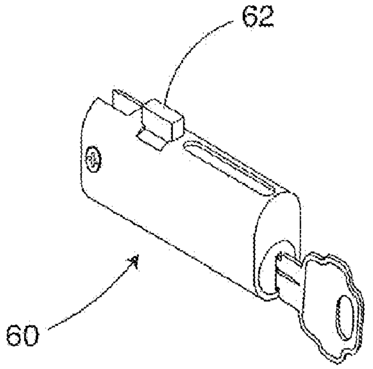
FIG. 24 (PRIOR ART)
FIG. 24 shows a typical prior art oval shaped plunger lock.
Figure 25:
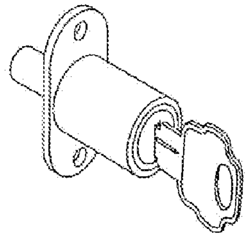
FIG. 25 (PRIOR ART)
FIG. 25 shows a typical prior art round shaped plunger lock.

Although a plunger type lock of the type often included on multiple-drawer file cabinets is not illustrated in the drawings, the invention applies to this type of lock as well. In that case the rotatable handle 12 on the lock unit 10 is replaced with a spring plunger unit with rotatable core, similar to a typical key-operated spring plunger unit such as the unit 60 shown in FIG. 24; the internal mechanism for holding the core against rotation can be similar to that described above, that is, an electrically operated blocking pin will release the rotatable core and handle 12 and upon core rotation the plunger slide blocking device (62 in FIG. 24) will be retracted allowing the spring plunger unit to release out by action of a spring thus opening the drawers. The side of the sliding plunger unit can be slotted to allow the electrically operated blocking pin to enter a channel in the side of the rotatable core, to hold the core against rotation when locked.

As mentioned above, instead of a solenoid operating the blocking pin operating in the lock housing 14, a miniature motor can be used. Such miniature motors require very small current and can be used to implement the extension or retraction of the pin that blocks the handle 12 or other device from being manipulated. The term electromagnetically operated device includes a solenoid or miniature motor or other appropriate driving electric device.

Figure 6:
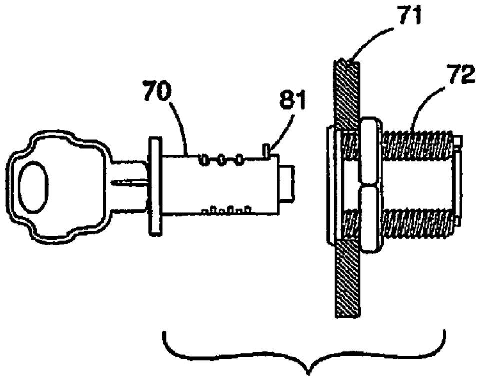
FIG. 6 (PRIOR ART)
FIGS. 6 and 6A show a typical cam lock shell mounted on a door with its plug being inserted.
Figure 6A:
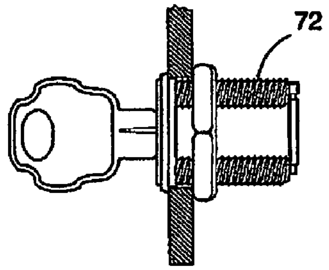
FIG. 6A (PRIOR ART)
Figure 7:
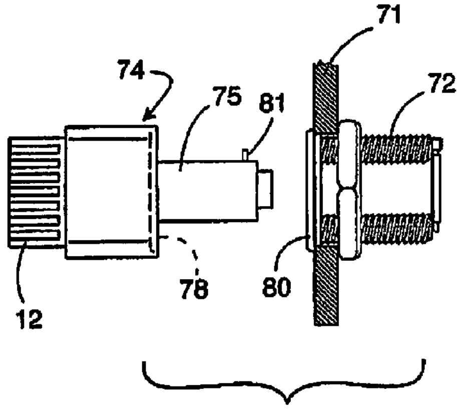
FIGS. 7 and 7A show the same configuration shown in FIGS. 6-6A replaced by the plug of the current invention.
Figure 7A:
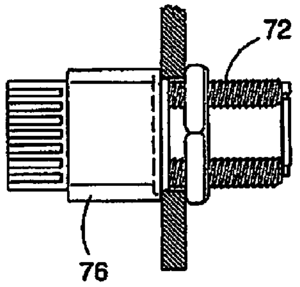

FIGS. 6-6A and 7-7A show a typical cam lock shell mounted on a door, with the plug 70 shown removed in FIG. 6 and inserted into the shell 72 in FIG. 6A to form the cylinder unit; and replacement by an electronic lock 74 with cylinder plug 75, retrofitted into the shell 72 in accordance with the invention (FIGS. 7 and 7A). The plug 75 is a "blank" plug that will operate the lock when installed via a retainer clip or pin 81, with the electronics to control access. In FIG. 7 the electronics housing 76 has a recess 78 shown in dashed lines, surrounding the extending plug 75, for the purpose of accommodating the slightly protruding face 80 of the cylinder shell 72 as installed in the door or drawer 71. Many of the cam locks used in furniture do have this type of front loaded plug which can also be removed for service and rekeying purposes.

Figure 8:
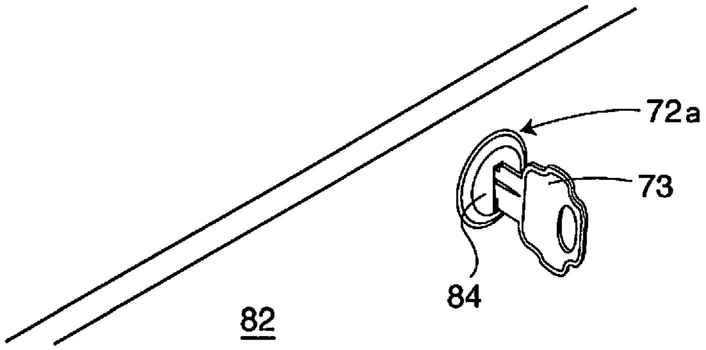
FIG. 8 (PRIOR ART)
FIGS. 8, 8A and 8B are perspective views showing replacement of an existing key operated cam lock cylinder plug with the current invention.
Figure 8A:
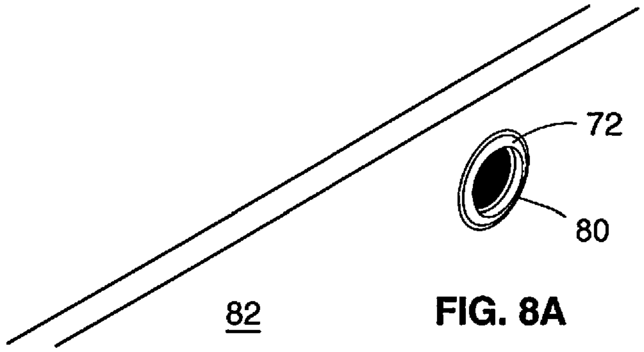
Figure 8B:
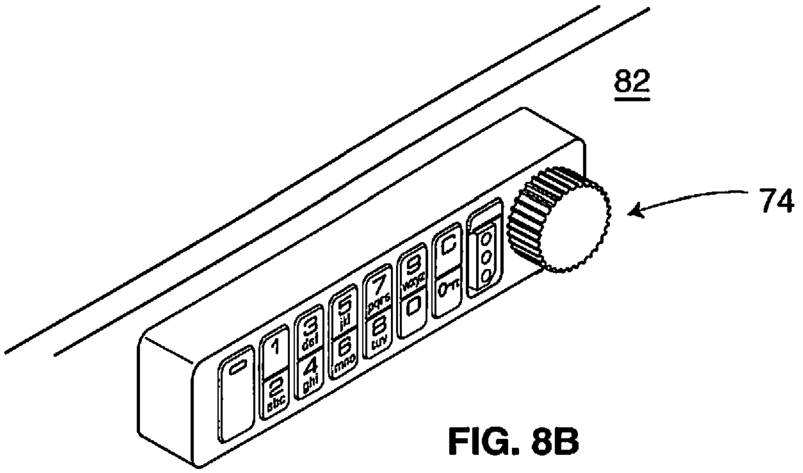

FIGS. 8, 8A and 8B show another door or drawer front 82 as fitted with a conventional cam lock or cabinet lock having a cylinder shell 72 such as shown in FIGS. 6 and 7. FIG. 8 shows the prior art lock 72*a* with a key 73 extending into a cam lock plug 84, while FIG. 8A shows the plug removed, revealing only the face plate 80 of the cam lock/cabinet lock cylinder 72. FIG. 8B shows the electronic lock 74 of the invention as installed into the opening defined by the lock cylinder 80 in door or drawer front 82. The lock 74 preferably has the same operational features as the lock described above with respect to FIGS. 1-5, the difference being that the plug 75 (FIG. 7) extends back from this unit, for fitting or retrofitting into an existing cylinder 72 that previously has had a conventional plug and key.

As is known by those skilled in the art, the prior art current plugs 70, 75 can be removed from the cylinder shell 72. This can be done by access to the spring loaded wafer or retainer clip 81. Access to this spring loaded retention device is restricted as is well known in the art.

Figure 9:
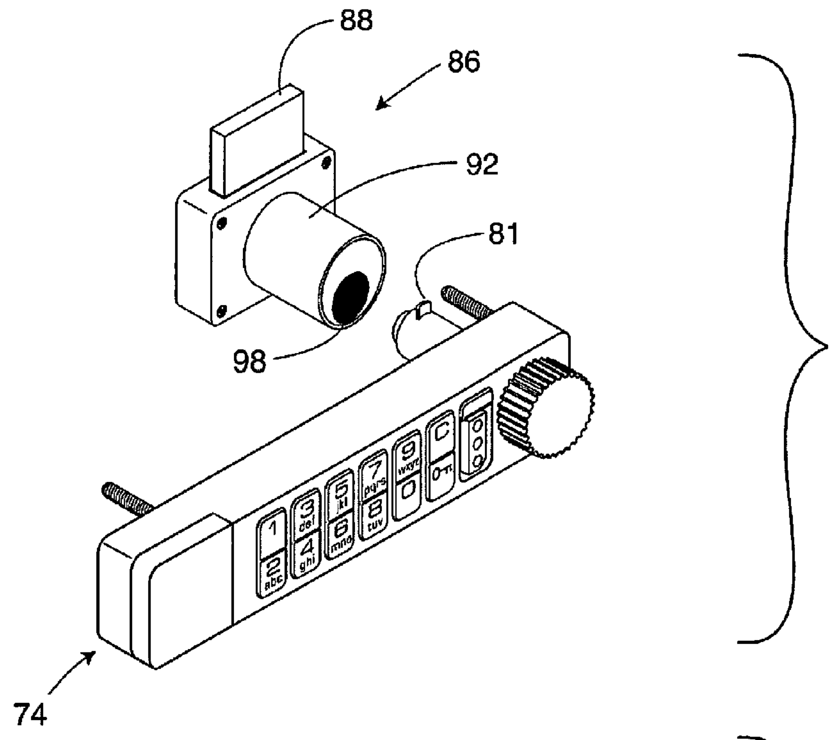
FIG. 9 is a perspective view showing the current invention with matching plug being applied to a cabinet lock with a bolt.
Figure 26:
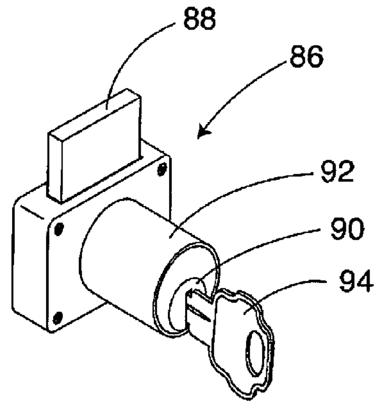
FIG. 26 (PRIOR ART)
FIG. 26 shows a typical prior art cabinet lock with bolt.
Figure 27:
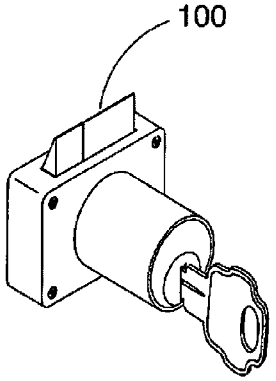
FIG. 27 (PRIOR ART)
FIG. 27 shows a typical prior art cabinet lock with spring loaded latch or deadlatch.
Figure 28:
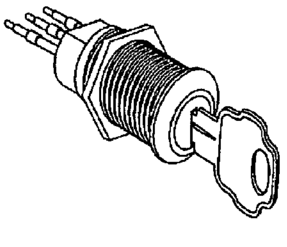
FIG. 28 (PRIOR ART)
FIG. 28 shows a typical prior art switch lock.
Figure 29:
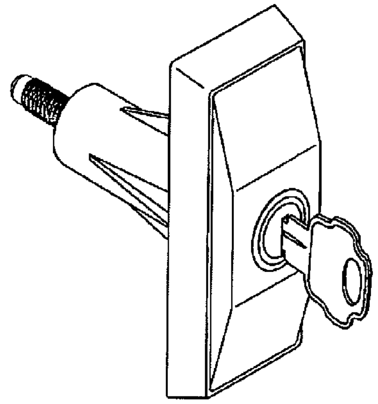
FIG. 29 (PRIOR ART)
FIG. 29 shows a typical prior art T handle screw type lock.
Figure 30:
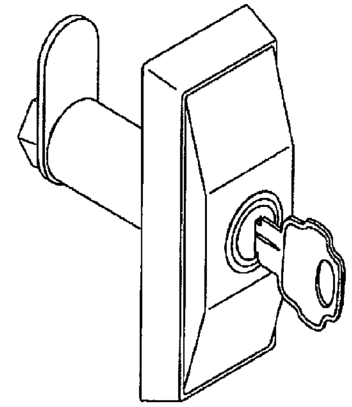
FIG. 30 (PRIOR ART)
FIG. 30 shows a typical prior art T handle cam type lock.

FIGS. 9-12, as well as the prior art views of FIGS. 26 and 27 all relate to another application of the invention. FIG. 9 shows an electronic lock unit 74 according to the invention in position to be assembled into an existing cabinet lock 86 of conventional design, the cabinet lock including an extendable/retractable bolt 88 which extends or retracts in response to, in the case of the prior art as shown in FIG. 26, rotation of a cylinder plug 90 that is positioned for rotation in the cabinet lock cylinder shell 92, and accessed by a key 94. The cylinder shell 92 extends through a door, drawer or other wall 96 as shown in the side elevation view of FIG. 11. Thus, in this type of lock there is no protruding face plate on the cylinder shell; the unit 86 is secured from the back, preferably via screws.

The exploded view of FIG. 9 shows that the unit 74 of the invention is simply inserted into the lock's plug opening 98, such that the plug 75 of the new unit goes into the hole 98 and refits the lock 86 just as the keyed plug was fit therein. Again, a spring loaded secure retainer 81 is included so that access is restricted. The retention of the plug can be achieved by another type of clip or retainer ring as well.

Figure 10:
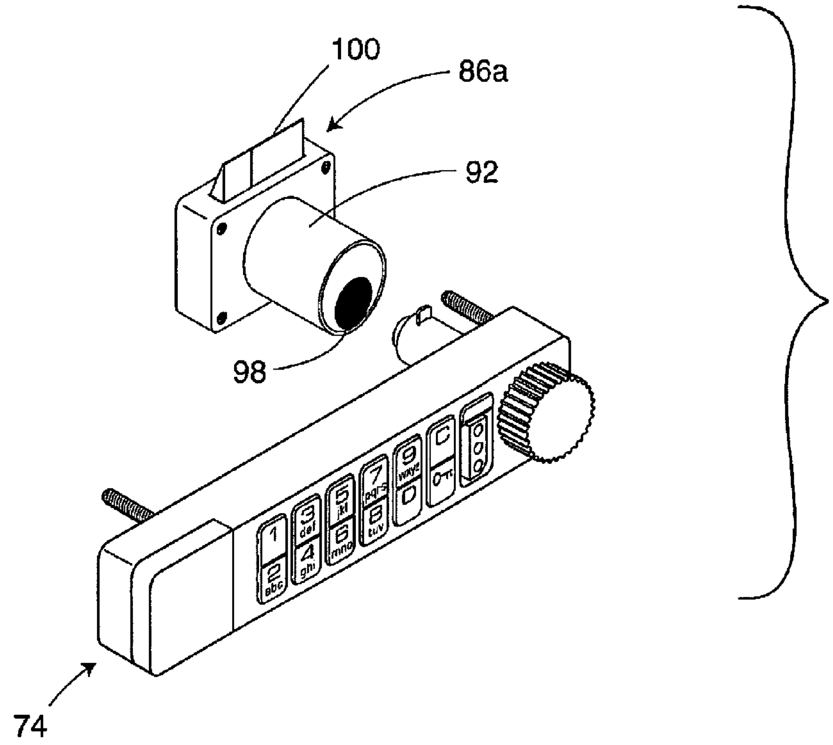
FIG. 10 is a perspective view showing the current invention with matching plug being applied to a cabinet lock with a spring loaded latch or deadlatch.
Figure 11:
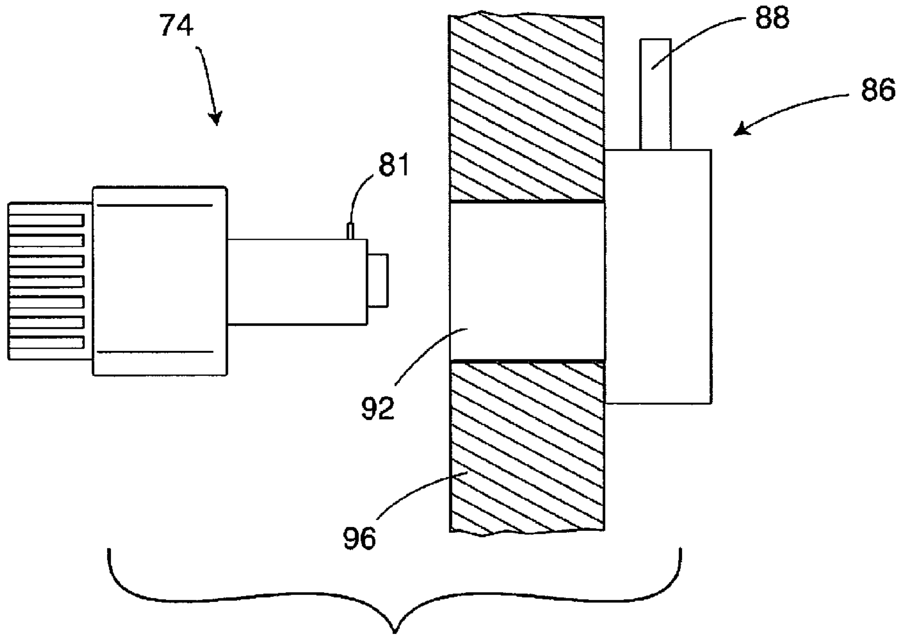
FIG. 11 shows a side view of what is shown in FIG. 9 being installed on a door or drawer.
Figure 12:
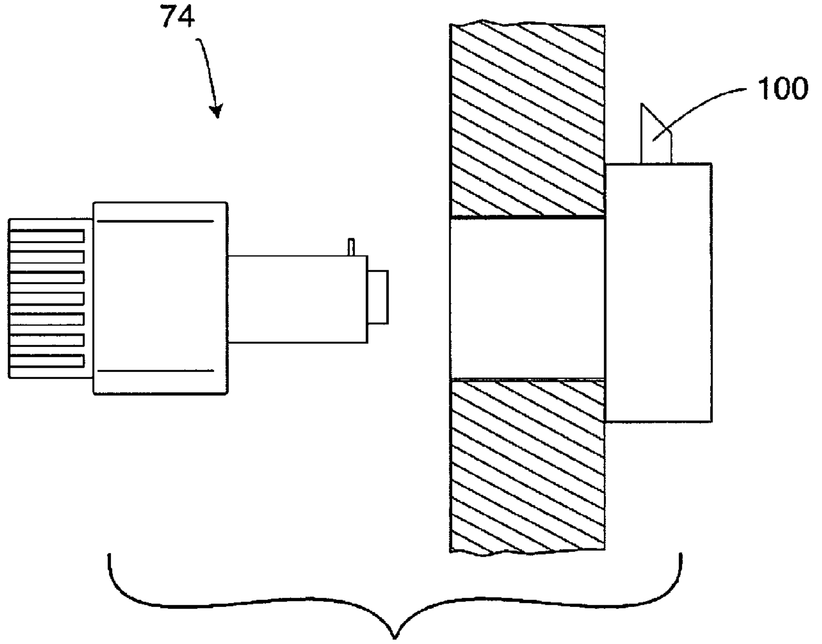
FIG. 12 shows a side view of what is shown in FIG. 10 being installed on a door or drawer.

FIGS. 10, 12 and 27 show a slightly different type of unit 86*a* wherein the locking device is a spring or dead latch 100 rather than a bolt such as shown in FIG. 9. The rest of the apparatus, including the unit 74 of the invention and the manner in which it is fitted into the lock to replace a keyed plug from the prior art, are the same.

FIGS. 13 through 21 show modified embodiments of the invention, particularly addressing situations in which an electronic lock of the invention will require components assembled from both inside and outside of a door, drawer, etc., as in the case of a cabinet lock, for example, as well as providing for a universal front electronic unit. The devices described with reference to FIGS. 9 through 12 are examples of two-part systems but they are principally for retrofit situations where in a "blank" plug extending from the electronic access device 74 of the invention is fitted into a cabinet lock type cylinder shell which is without a plug. In the variations shown in FIGS. 13 through 21, which should be viewed along with corresponding prior art views of FIGS. 23-30, the outside and inside components are connected together simply by a driver or extension of keyed shape, such as square, splined, D-shaped, flat, etc., since no plug or conventional cylinder with mechanical bittings or wafers is needed. Moreover, the embodiments of these drawings enable variations in depth to be accommodated, since a plug is not required to be seated to a prescribed depth in a cylinder shell.

Figure 13:
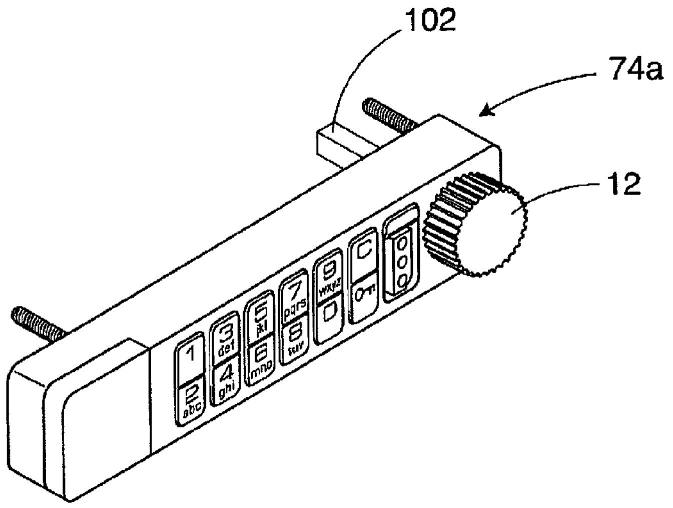
FIG. 13 shows a perspective view of an electronic cam, cabinet or plunger lock of the invention with special shaped driver extending from the rear of the device.

FIG. 13 shows an electronic lock 74*a* of the invention, similar to the lock 74 described above in most respects and applicable to a cam, cabinet, plunger lock or similar lock, but with a specially shaped driver 102 extending back for engagement with a latching or locking device (lock unit) to be secured on the back side of a door, drawer, panel, etc. The driver 102 is operable by rotating the knob 12 as described previously, or a handle as shown and discussed below. The driver may permanently attach to the knob or handle, or it can be an insert, whereby different lengths of driver can be used for different panel thicknesses.

Figure 14:
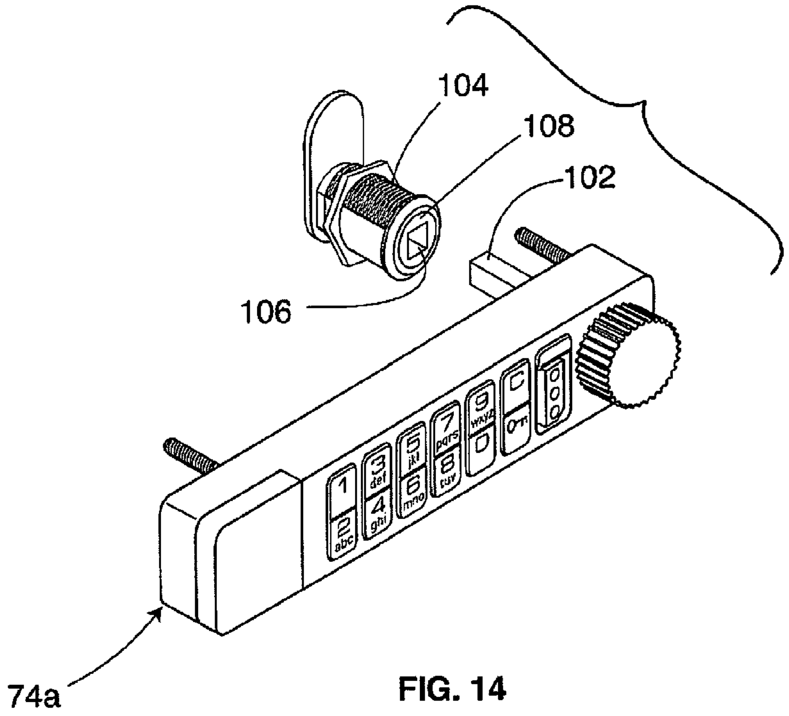
FIG. 14 shows a perspective view of the current invention with a specially shaped driver being applied to a cam lock with matching plug.

FIG. 14 is an assembly view indicating the electronic lock unit 74*a*, with the lock driver 102 being essentially straight and perpendicular to the back of the unit and having a square cross sectional shape, and a cam lock or lock unit 104 with a similar specially shaped hole or receiving socket 106 in a rotatable plug 108. As noted above, it should be understood that any slide-in keyed cross-sectional shape can be employed, square being one example, but also including, flat, star-shaped, splined, D-shaped, etc. It can be seen, by comparison to FIGS. 3-5, that the embodiment of FIG. 14 is an alternative to that earlier-described embodiment.

Figure 15:
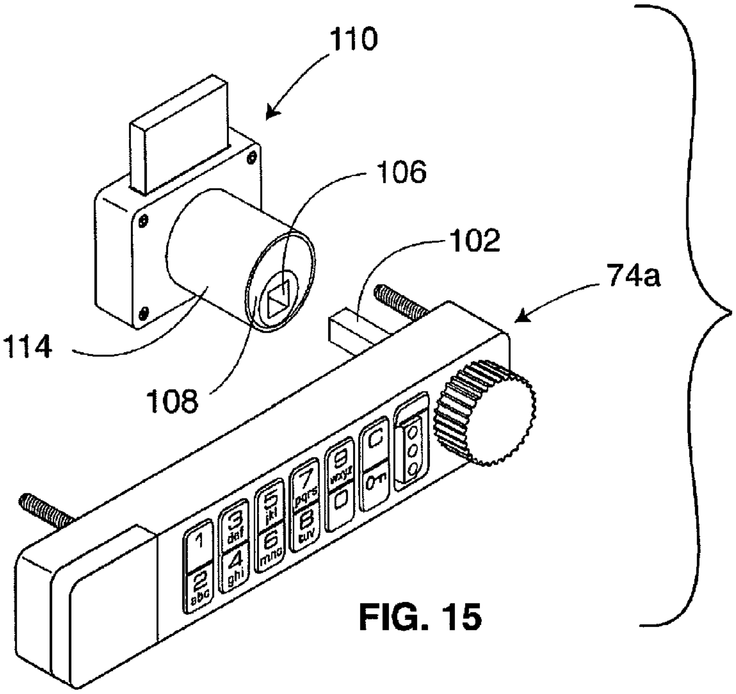
FIG. 15 shows a perspective view of the current invention with a specially shaped driver being applied to a cabinet lock with bolt with matching plug.
Figure 16:
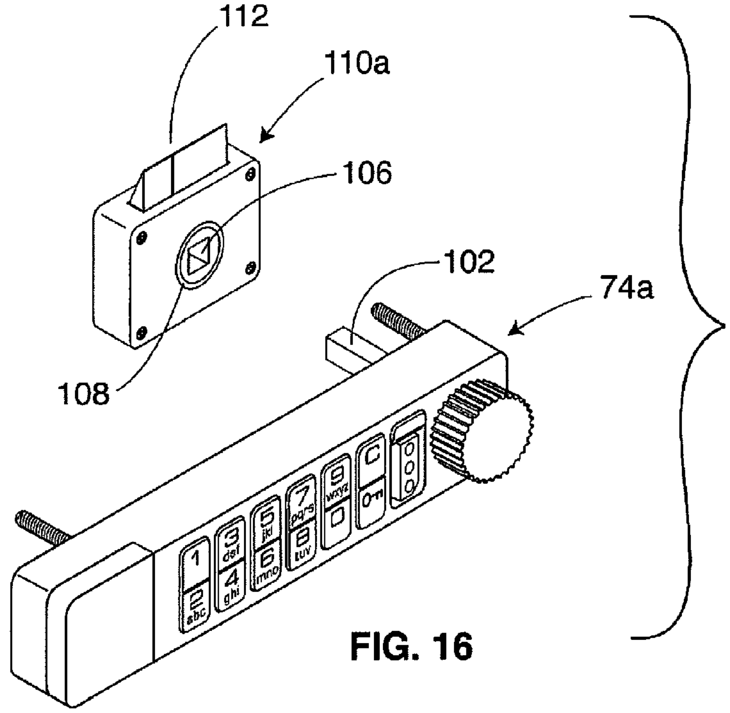
FIG. 16 shows a perspective view of the current invention with a specially shaped driver being applied to a cabinet lock with latch or deadlatch.

FIG. 15 shows the electronic lock unit 74*a*, with the specially shaped driver 102, positioned for assembly into a different type of lock, in this case a cabinet lock 110 of the type shown in FIG. 9 as the cabinet lock 86. In this case, of course, the special driver 102 extends into a complementary hole 106 in a rotatable plug 108 of the cabinet lock 110, rather than a blank plug extending into a plug opening as in the embodiment of FIG. 9. FIG. 16 shows a similar arrangement, with the cabinet lock 110*a* having a latch or dead latch 112 rather than a deadbolt. In FIG. 16 the cabinet lock unit 110*a* is shown without an extending barrel or shell 114 as in FIG. 15. In some cases, especially metal cabinets (such as file cabinets), there is no need for this projection 114. The components can be arranged so that the fasteners shown extending back from the housing will not interfere with the lock unit 110*a*. The lock unit 110*a* can be mounted onto the unit 74*a* sandwiching the door panel or each can be mounted independently to the panel. In FIG. 15 as well, the extension 114 can be eliminated.

The lock unit as shown in FIGS. 15 and 16 provides for more universal connections and standardization of lock components as compared to the earlier-described embodiments. A manufactured line of cabinets, drawers, doors, etc. can have prescribed types of lock units, with a cam lock, cabinet lock, plunger or other types as described below, and all can be arranged to be engaged with the electronic lock unit 74*a* of the invention. Depths due to different thicknesses of drawers, doors, etc. can be accommodated without providing a series of different shell depths for the shell 114 extending forward from the mechanical cam lock or cabinet lock or other lock unit. The electronic lock unit 74*a* can be universal for many different situations and applications.

Figure 17:
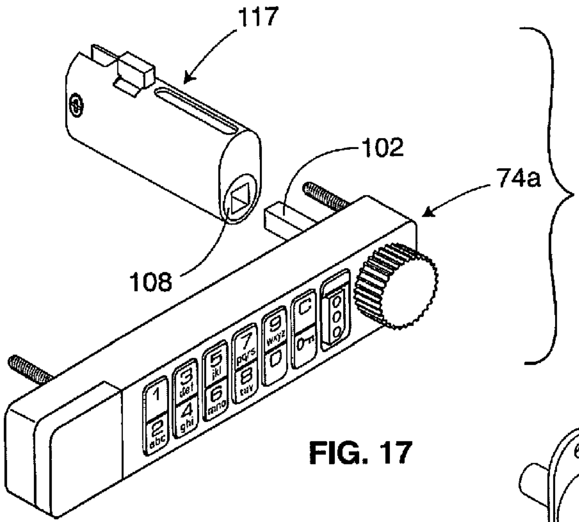
FIG. 17 shows a perspective view of the current invention with a specially shaped driver being applied to an oval shaped plunger lock with matching plug.
Figure 18:
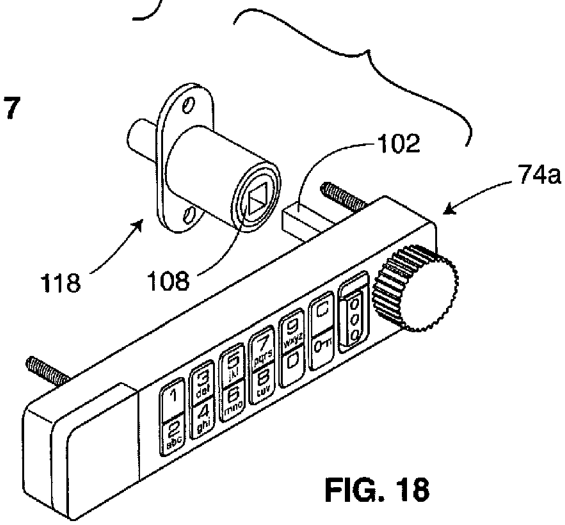
FIG. 18 shows a perspective view of the current invention with a specially shaped driver being applied to a round shaped plunger lock with matching plug.
Figure 19:
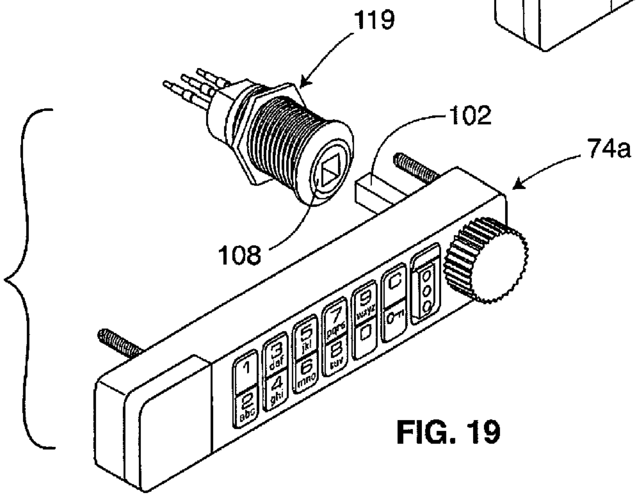
FIG. 19 shows a perspective view of the current invention with a specially shaped driver being applied to a switch lock with matching plug.

FIG. 17 shows the same electronic lock unit 74*a* of the invention being applied to an oval shaped plunger lock 117, again with a matching rotatable plug 108 for receiving the special driver 102. FIG. 18 shows the lock unit 74*a* being applied to a round shaped plunger lock 118, again with a plug 108 matched to the driver 102 of the unit 74*a*. FIG. 19 shows the same electronic lock unit 74*a* being applied to an electric switch lock 119, again with a plug 108 matched to the driver 102.

Figure 20:
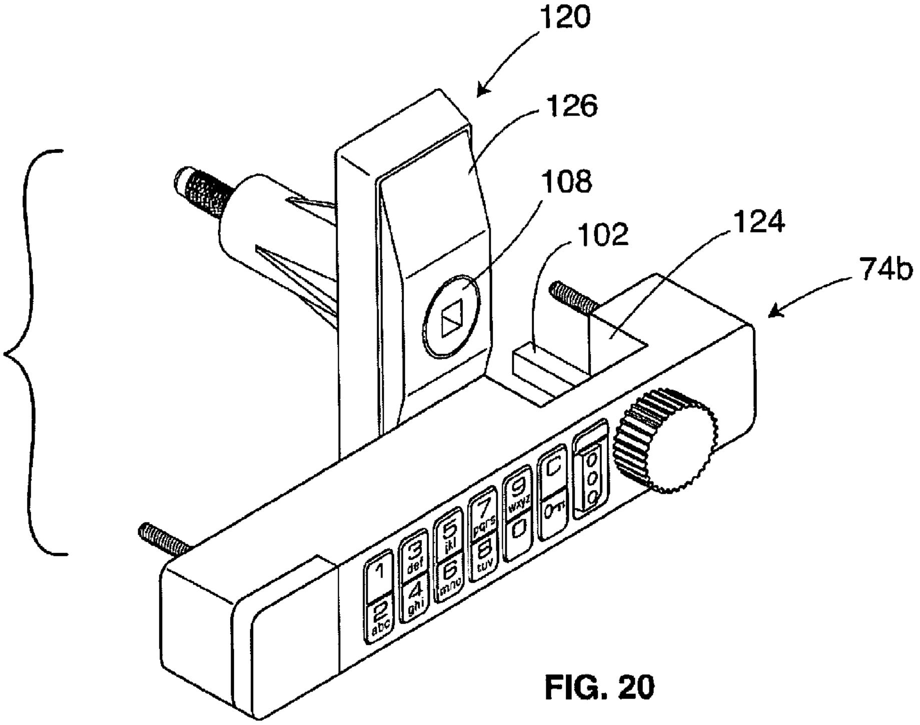
FIG. 20 shows a perspective view of the current invention with a specially shaped driver being applied to a screw type T handle lock with matching plug.
Figure 21:
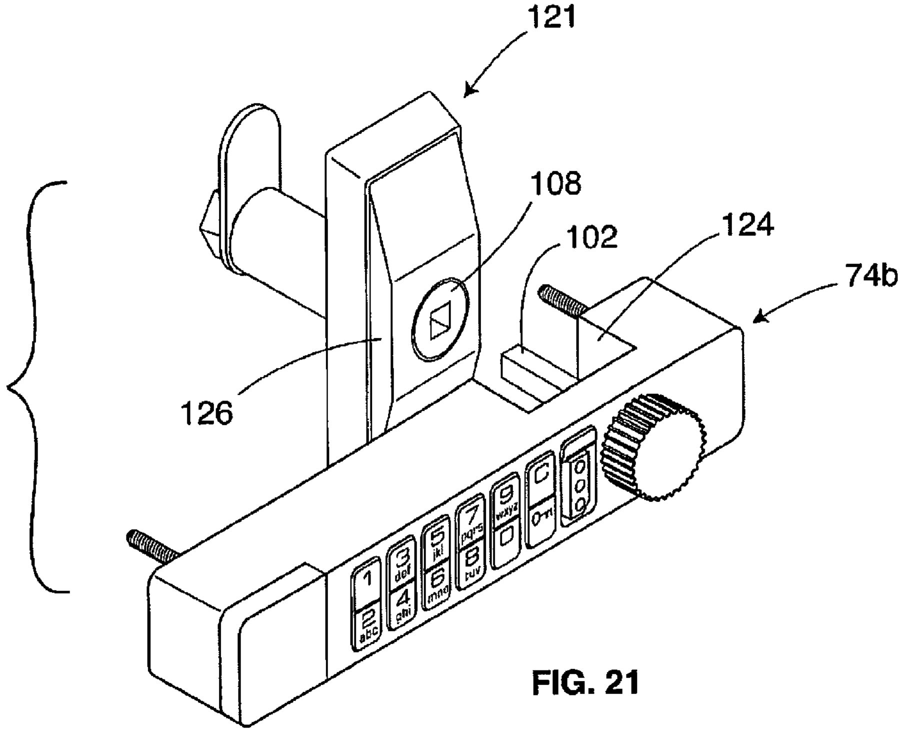
FIG. 21 shows a perspective view of the current invention with a specially shaped driver being applied to a cam type T handle lock with matching plug.

FIG. 20 shows a modified electronic lock unit 74*b* being applied to a screw type T handle lock 120, again having a plug 108 matched to the special driver 102; FIG. 21 similarly shows the modified electronic lock unit 74*b* being applied to a cam type T handle lock 121, with the plug 108 and driver 102 matched. In both FIGS. 20 and 21, the back side of the lock unit 74*b* has a recess 124 that accommodates the outward extension 126 of the T handle lock, to the extent it protrudes out from the surface of the door, drawer, etc. When the electronic lock unit 74*b* is secured fast to the door, drawer or panel it appears integrated with the T handle lock 120 or 121. Note that in this case, the invention involves a lock unit 120, 121 that is assembled onto the front of the door or drawer, with the electronic unit 74*b* installed over it.

Figure 22:
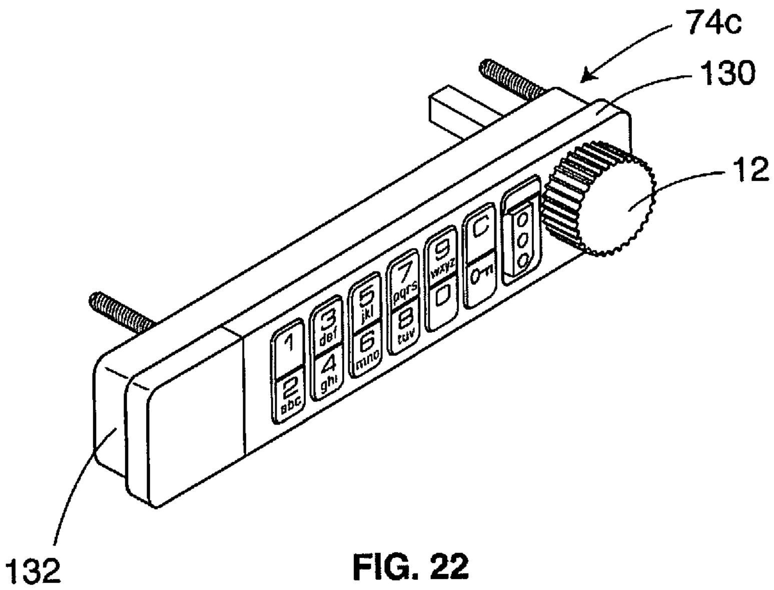
FIG. 22 shows a perspective view of the current invention with a built in flange allowing recess mounting.
Figure 22A:
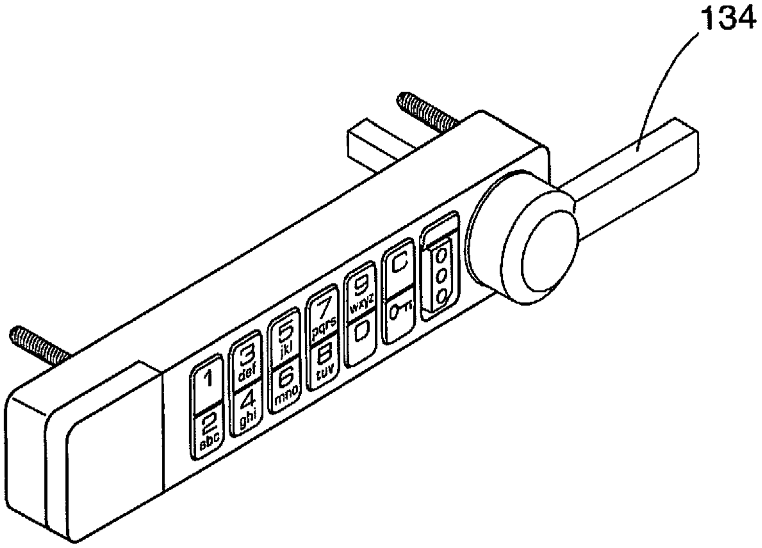
FIG. 22A shows a variation of FIG. 22 in which a lever replaces a knob, a variation applicable to all embodiments.

FIG. 22 shows a modified electronic lock unit 74*c* of the invention, in this case with an integral flange 130 designed to allow recess mounting of the base part 132 of the housing. FIG. 22A simply shows a variation, applicable to all embodiments, wherein the rotatable handle 12 is replaced with a lever 134, which may be needed for handicap access or for other purposes as desired. The term cam lock as used in the claims is intended to refer to a cam lock or cabinet lock, or a plunger lock or switch lock or T handle lock. Also, references to a knob or handle are to be taken as referring to any type of turning device provided to operate the cam lock manually. Further, reference to a panel of a door, cabinet or drawer is intended to refer to any access panel or a fixed panel from which an openable component is controlled.

Note also that although a keypad is shown in the preferred embodiment above, the lock can be operated by a keypad in combination with an electronic key (used at the contact connection 22), or the keypad can be eliminated in favor of an electronic key alone. The term electronic access device refers to either type of electronic access.

Also, the electronic lock housing 14 can be oriented vertically instead of horizontally, with keypad characters oriented 90° from what is shown. Further, the cam in the illustrated embodiment can be rotatable to various degrees to fit the application.

Figure 31:
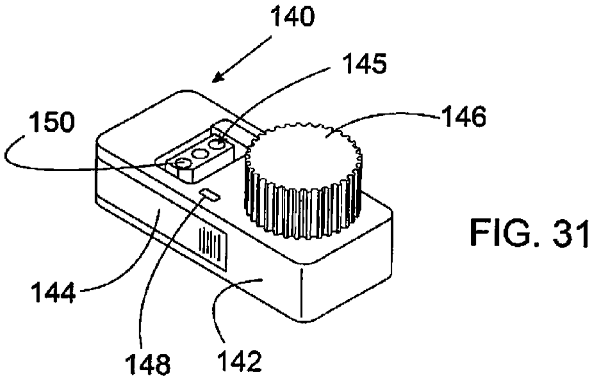
FIG. 31 is a perspective view showing an electronic cam type lock of the invention, for a cam lock and similar functions, with a receptacle for electronic input and without a keypad.
Figure 32:
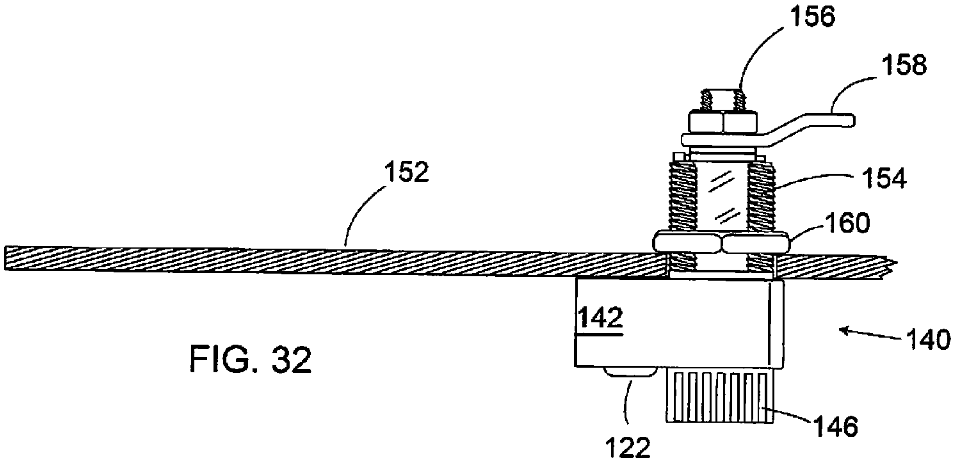
FIGS. 32 and 33 are sectional plan and elevation views showing the lock device of FIG. 31.
Figure 33:
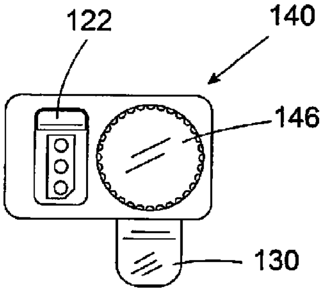

FIGS. 31-33 show a lock 140 according to the invention. The lock 140, which has a housing 142, preferably has batteries within a battery compartment 144 shown on a side of the unit, and a terminal 145 is also included. The lock unit 140 is the sole electronic housing for a lock, and may be part of a cam lock or cabinet lock, as well as a locker lock or a driver for any kind of lock or key switch mechanism which is mounted on a panel behind the lock 140. All of the drawings show different forms of this compact electronic lock unit.

The lock 140 has a rotatable knob or handle 146 extending from the housing 142 (the handle could be a lever if required or desired). The lock 140 is preferably without a keypad but in other respects is preferably very similar to the lock shown in U.S. Pat. No. 8,495,898. The lock unit 140 is very compact and if it has onboard batteries they can be small standard cells or coin cell type batteries. A status indicator light is shown at 148.

The lock is operated using a key device such as that shown in copending application Ser. No. 12/072,557, and related U.S. Pat. No. 7,336,150, and the disclosure of both are fully incorporated herein by reference. The key device preferably has batteries and makes contact with the electrical contacts 150 shown in the terminal 145 at the front side of the housing. The lock unit 140 can be without batteries; if it does have onboard batteries within the housing 142 (within the compartment 144 shown in FIG. 31), then a set of key devices for the lock, or for a series of similar locks, can include small key contact devices having no battery and having two contacts for engagement with two of three contacts 150 shown in the terminal 145 on the lock. A master or manager's key device can be somewhat larger, with onboard batteries carried in the key device, with three contacts for engaging with all three of the contacts 150 in the terminal 145. This enables a manager to use the special key to provide jump power to the lock 140 in a case where the lock's battery is low or when a user of the lock has forgotten his key or the key is somehow nonfunctional, or for both situations simultaneously. The terminal 145, and the contacts on the key, can be structured in accordance with the drawings and description of copending application Ser. No. 12/072,557, as well as U.S. Pat. No. 7,336,150, for protection of the contacts of both the lock and the key and to ensure proper engagement.

FIGS. 32 and 33 show one form of the lock 140 in a side or top elevation view, installed in FIG. 32 in a panel 152 such as on a door, file cabinet, drawer, locker door, or other type of application. In FIGS. 32 and 33 the lock is essentially in the configuration of a cam lock, wherein the handle or knob 146 connects directly with a cam lock cylinder unit (without tumbler pins or wafers) 154; specifically, the handle 146 turns a moveable member, e.g. a rotatable bolt or core 156 which rotates within the fixed cylinder unit 154 when permitted by the electronics. FIG. 32 shows one example of latching with the cam lock device, with a metal arm or cam 158 rotatable with the bolt 156, to be rotated using the handle 146 when permitted. A nut or threaded ring 160 retains the lock unit to the panel 152, in a position such that the arm or cam or latch 158 engages behind a ledge or in a slot or other appropriate element when the door, drawer, locker door, etc. is to be in a locked condition.

The lock unit 140 is extremely compact and can have dimensions of, for example, about two inches in width (the horizontal direction as seen in FIG. 33); about ⅞ inch in height (the vertical direction in FIG. 33); and about ½ inch in thickness. More broadly the size is in the range of about 1½ to 3 inches wide, about ⅞ to 1⅛ inch in height and about ⅜ to 1 inch thick.

Figure 34A:
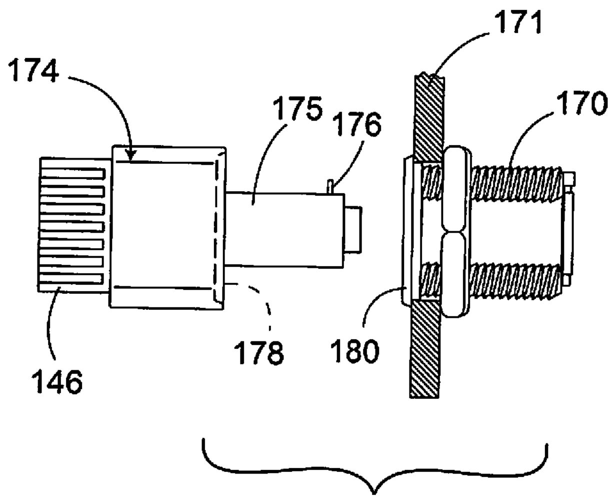
FIGS. 34A and 34B are partially sectioned side elevation views showing a modified lock device as fitted into an existing cam lock or similar situation.
Figure 34B:
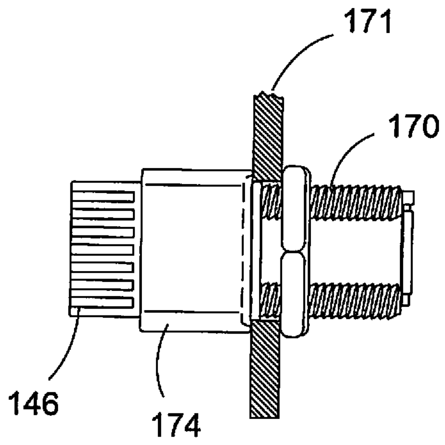

FIGS. 34A and 34B show a typical cam lock shell 170 mounted on a door or drawer 171, with the typical cam lock plug removed, and replaced with an electronic lock 174 with a cylinder plug 175, retrofitted into the shell 170 in accordance with the invention. The plug 175 is a "blank" plug that will operate the lock when installed via a retainer clip or pin 176, with the electronics as discussed above to control access. In FIG. 34A the electronics housing 174 has a recess 178 shown in dashed lines, surrounding the extending plug 175, for the purpose of accommodating the slightly protruding face 180 of the cylinder shell 170 as installed in the drawer or door 171. Many cam locks used in furniture have this type of front loaded plug which can also be removed for service and re-keying purposes. This is similar to what is shown and discussed above, but with the more compact electronic lock unit of the type shown in FIGS. 31-33. This configuration is advantageous in applications where an existing mechanical lock is fitted to the cabinet that has a brand-specific cam device or other linkages that are attached to the cam device for operating multiple drawers or doors.

Figure 35A:
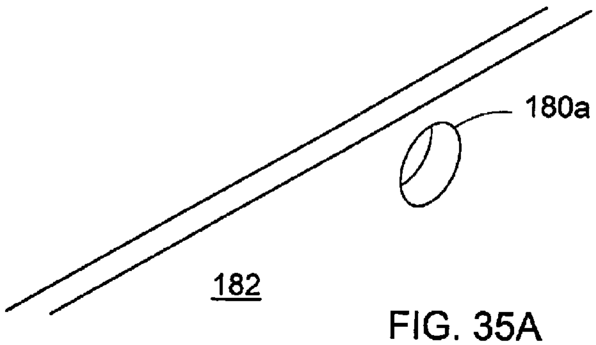
FIGS. 35A, 35B and 35C are perspective views showing a drawer or door panel having provision (a hole) for a cam lock or cabinet lock, an embodiment of a cam lock of the invention, and the cam lock as installed in the panel.
Figure 35B:
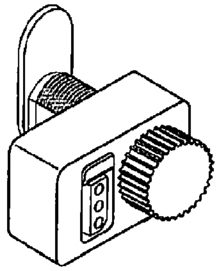
Figure 35C:
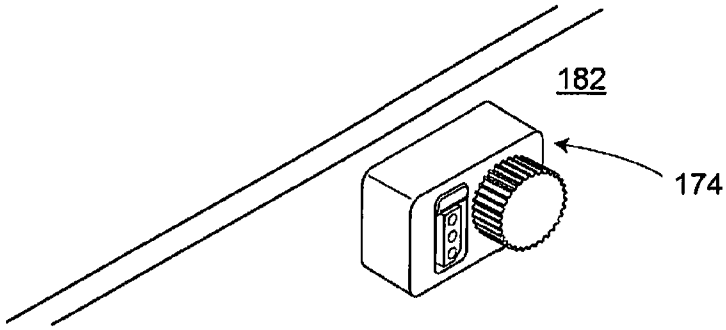

FIG. 35A shows the door or drawer front 182 with a lock mounting hole 180*a*. This hole may be round as shown or a single or double "D" shape commonly used in the industry. The mounting can be similar to FIGS. 32 and 33. FIGS. 35A-35C show a panel, drawer or door 182 with a conventional cam lock removed. FIG. 35B shows the compact self-contained electronic lock 174 of the invention as a replacement installed through the hole 180*a* in the same manner as the mechanical lock it replaces.

Reference is made to U.S. Pat. No. 8,495,898 (incorporated by reference herein) regarding other applications of the electronic lock generally as shown in FIGS. 31-33 and FIGS. 34A and 34B herein. The compact lock of the invention can be formed with a cylinder plug type rear extension that fits into an existing cabinet lock with bolt or latch of the types as shown, for example, in FIGS. 9-12 of that patent.

Figure 36:
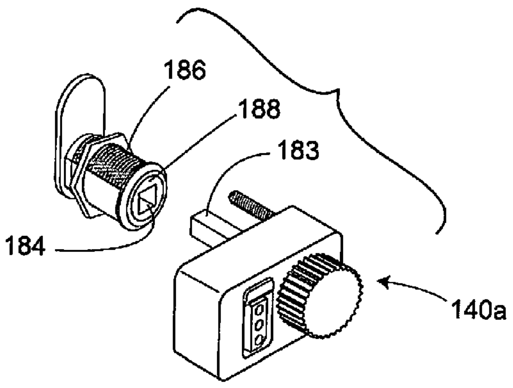
FIG. 36 is a perspective view, exploded, showing a lock device of the invention and indicating its installation into a modified cylinder device of a cam lock or cabinet lock.

FIG. 36 shows another application of the compact lock of the invention, similar to that of FIGS. 13-14. Here, a compact electronic lock 140*a* operates similarly to the lock 140 of FIGS. 31-33 but has a simple spindle or driver 183 extending back from the rear of the unit, essentially straight and perpendicular to the back of the unit and having, for example, a square cross sectional shape. The driver 183 fits in driving contact with a similarly shaped driver hole or receiving socket 184 in a cam lock or lock unit 186. The receiving socket 184 is in a rotatable plug 188 of the lock unit 186. As discussed above, it should be understood that any slide-in keyed cross-sectional shape can be employed for the driver 183, square being one example but also including flat, star-shaped, splined, hex, D-shaped, etc. The lock shown in FIG. 36 is an alternative to other lock arrangements such as FIGS. 34A-34B wherein a dummy cylinder plug is the element that extends to the rear of the electronic lock unit.

Figure 37:
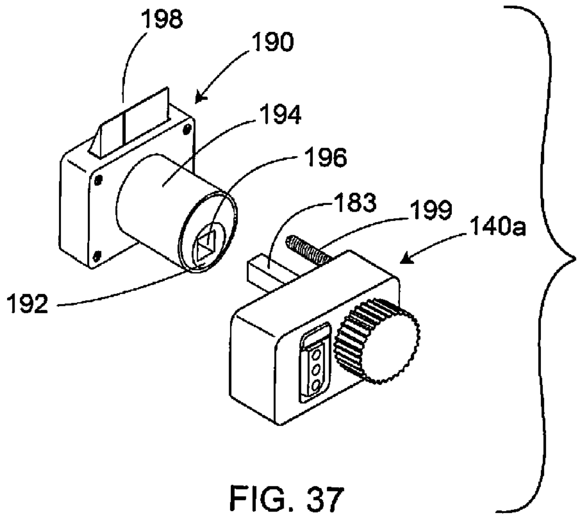
FIG. 37 is a view somewhat similar to FIG. 36, but showing the device being fitted with a pin/tumbler cylinder of a cabinet lock and with a spring latch.

FIG. 37 shows another application of the compact electronic lock unit 140*a*, with the specially shaped driver 183 positioned for assembly into a different type of lock, in this case a cabinet lock 190 of the type that has an off-center rotatable plug 192, a replacement for a conventional cabinet lock device having internal pins and tumblers that act between the plug 192 and the cylinder shell 194. Here, the driver 183 extends into a complementary hole 196 in the rotatable plug 192. Note that the drawing shows a retractable spring latch or dead latch 198 in this embodiment, but instead there could be a deadbolt. This is similar to an embodiment described earlier and in U.S. Pat. No. 8,495,898, but with the abbreviated and compact electronic lock 140*a* of the invention. As explained in that patent, this application of the lock provides for more universal connections and standard provision of lock components as compared to some of the earlier-described embodiments. A manufactured line of cabinets, drawers, doors, etc. can have prescribed types of lock units, with a cam lock, cabinet lock, plunger or other types, and all can be arranged to be engaged with the electronic lock unit 140*a* of the invention. Depths to the different thicknesses of drawers, doors, etc. can be accommodated without providing a series of different shell depths for the shell 194 extending forward from the mechanical cam lock or cabinet lock or other lock unit. The electronic lock unit 140*a* can be universal for many different situations and applications. Note that a single threaded stud 199 is shown in this and other drawings for securing the compact lock to a door, drawer, etc., but any suitable form of attachment can be used. In the case of FIG. 37 the stud 199 or studs (or threaded holes) must be wide enough out from the driver 183 that they will clear the cabinet lock unit 190.

Figure 38:
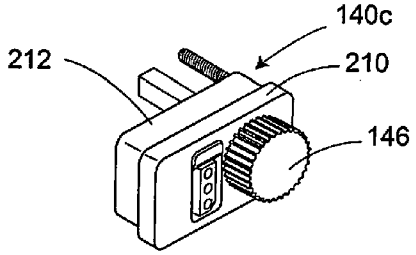
FIG. 38 is a perspective view showing a modified lock device of the invention with provision for recessed mounting.

FIG. 38 shows a modified electronic lock unit 140*c* of the invention, in this case with a flange 210 designed to allow recess mounting of the base part 212 of the housing. The flange 210 may be integrally formed with the base part 212. Thus, the flange 210 is configured to engage against the outside surface of a door or drawer. It should be understood, as pointed out earlier, that the rotatable knob or handle 146 shown in FIG. 38 can be replaced with a lever, which may be needed for handicap access or for other purposes as desired.

Figure 39A:
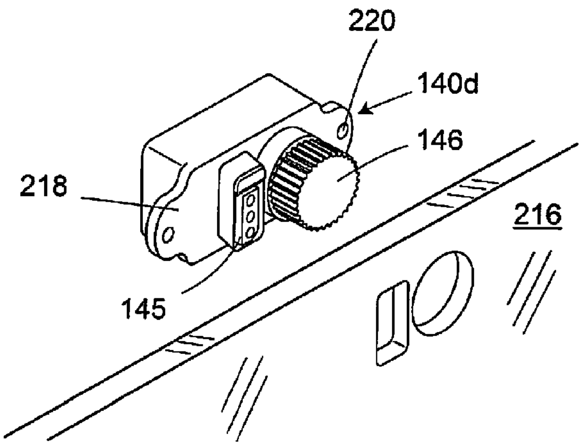
FIGS. 39A to 39C are perspective and cross section views showing a through-panel mounting for an electronic lock of the invention.
Figure 39B:
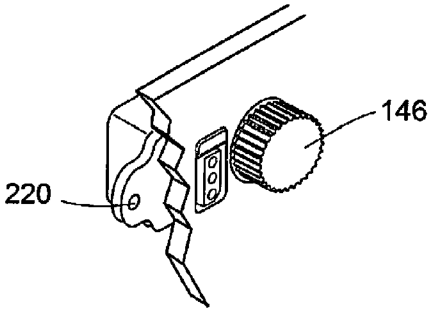
Figure 39C:
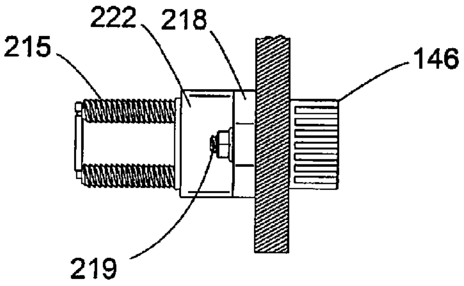

FIGS. 39A through 39C show a self-contained electronic lock unit 140*d* similar to the locks shown above and including a cylinder 215 with an appropriate actuator such as a cam or other latching device, or simply with a driver such as shown at 183 in FIGS. 36 and 37. In this case the electronic lock device 140*d* is mounted behind the panel 216 of a door, drawer, etc. in a through-the-panel mounting, with the knob or handle 146 and the terminal 145 having an adequate mounting depth protruding from a base plate 218 to extend through the thickness of the panel 216, as shown in FIGS. 39B and 39C. The base plate 218 installs flatly against the back side of the panel 216 and is secured by appropriate fasteners 219 through holes 220. The depth to which the knob or handle 146 and the terminal 145 are floated out from the base 218 is matched to the type of panel 216 to which the lock is to be secured (e.g. wood panel, steel panel, etc.). It should be understood that although a cylinder structure is shown in FIG. 39C, this could simply be a cam such as shown at 158 in FIG. 32, or a latch such as shown at 190 in FIG. 37 or another type of engaging device for locking the panel to other structure. Depth concerns may dictate that a cam or latch be provided immediately behind the housing 222 shown in FIG. 39C, without the cylinder structure 215 extending back to increase the depth. A battery compartment (not shown) can be located similarly to what is shown in the locks described above, with a battery door located for maximum convenience. In a low-battery condition a power jump can be made via the terminal 145 as described earlier.

Figure 40A:
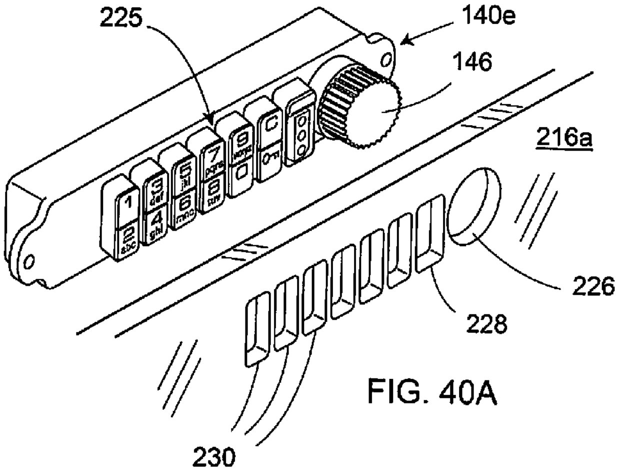
FIGS. 40A to 40C are perspective and cross section views similar to FIG. 39A-39C, showing a modified lock with a keypad.
Figure 40B:
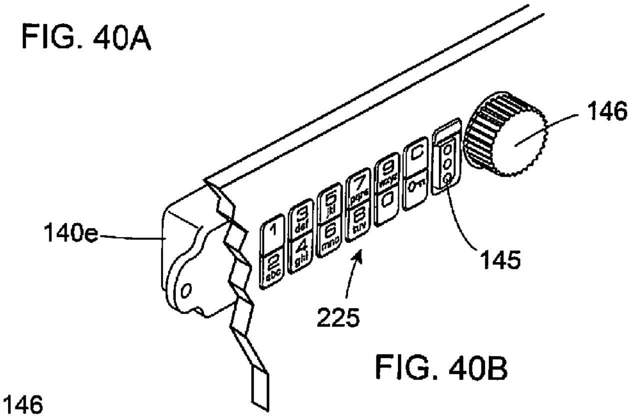
Figure 40C:
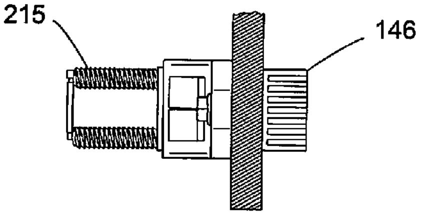
Figure 40D:
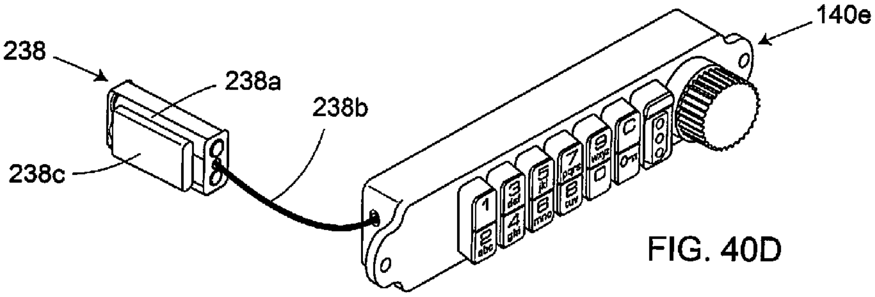
FIG. 40D shows an alternative battery arrangement.

FIGS. 40A through 40C are similar to FIGS. 39A through 39C, but show a keypad 225 on an electronic lock device 140*e*. This lock device 140*e* is similar to above-described embodiments, but with the lock unit mounted behind the panel 216*a* in a through-the-panel mounting, as described with respect to FIGS. 39A-39C. Holes 226, 228 and 230 are provided in the panel for this purpose. Note that the holes 228 and 230 could be replaced by a singular rectangular opening. Again, a different latching or securing mechanism can be included instead of the cylinder structure 215 shown in FIG. 40C, for the reason explained above for FIGS. 39A-39C. FIG. 40D shows that, as an alternative to a battery compartment located accessibly in the housing of the lock

140*e*, the battery can be in a separate battery pack or casing 238 as shown. The battery 238*a* connects to the lock housing by a wire 238*b*; a magnet 238*c* can be provided to mount the battery on a steel panel, or adhesives or Velcro (hook and loop fasteners) can be used.

The term cam lock as used in the claims is intended to refer to a cam lock or cabinet lock, or a plunger lock or switch lock or T handle lock or locks of similar application. Also, references to a knob or handle are to be taken as referring to any type of turning device provided to operate the cam lock manually. Further, reference to a panel of a door, cabinet or drawer is intended to refer to any access panel or a fixed panel from which an openable component is controlled, in situations where ingress is provided but not egress, as in office furniture.

It should also be understood that the manually-operated locks described above relative to all figures could instead be automatic, with electromagnetic operation to retract a latch or rotate a cam, such as a solenoid or miniature motor, both of which are referred to as an electromagnetic actuator.

The term driver, although used above to refer to the cross-section specific driver 183 in FIGS. 36 through 38, more generally refers to an element that transfers the rotational motion of the knob or handle to the rear of the lock device, which can be through a cylinder, or via a dummy plug or other element, including a cross-section specific driver or spindle.

The term "cylinder" or "cylinder unit" as used herein is intended to mean at least a collar extending part way back from the housing, not necessarily as deep as the driver within the cylinder or collar, the driver being within the collar and rotatable within the collar.

Figure 41:
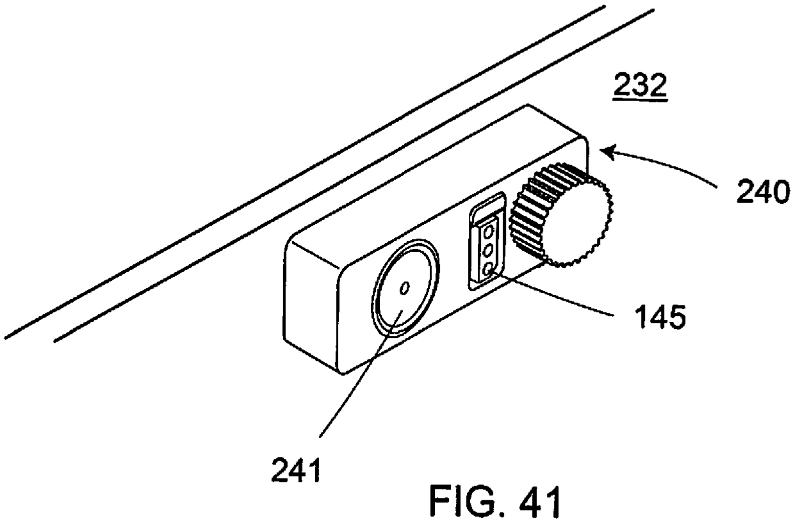
FIG. 41 is a perspective view showing a lock device of the invention with a key reader and an IButton reader.

FIG. 41 shows a panel with another application of a compact lock 240 of the invention, similar to that of FIG. 35C but with the additional input device 241 designed to receive an IButton input, which can be the primary means of accessing the lock.

Figure 42:
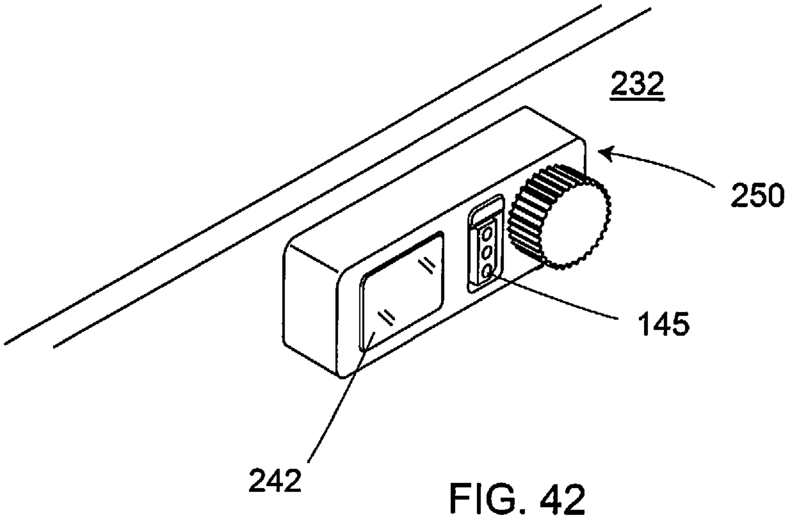
FIG. 42 is a perspective view showing a lock device of the invention with a key reader and a wireless reader.

FIG. 42 shows another application of a compact lock 250 of the invention, similar to that of FIG. 35C but with an additional input device 242 designed to receive wireless input from wireless access credentials such as RFID tags, proximity access cards and other wireless access technologies. The wireless technologies are commonly used for accessing the lock devices of the invention, reducing the number of credentials the user has to carry. Additionally the lock devices may be fitted with Bluetooth or similar interfaces to communicate with handheld small computers, PDAs or mobile telephones for access as well as uploading and downloading data to and from the lock devices. The lock driver may also communicate with specially designed hubs as part of a network and receive valid access data and send audit data or maintenance data or other desired data. This data may be access programming data or data containing audit trail or usage information as well as application specific data for the usage of the cabinet such as insertion or removal of files or other items to and from the cabinet.

Figure 45:
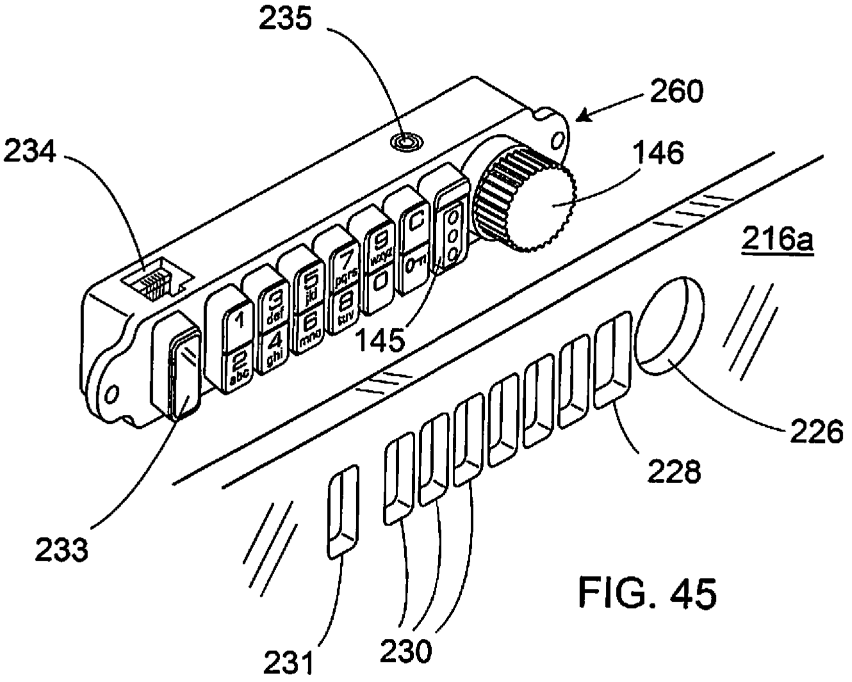
FIG. 45 is the same lock device shown in FIG. 40A but with the addition of a network antenna, network jack receptacle and external power port.
Figure 46:
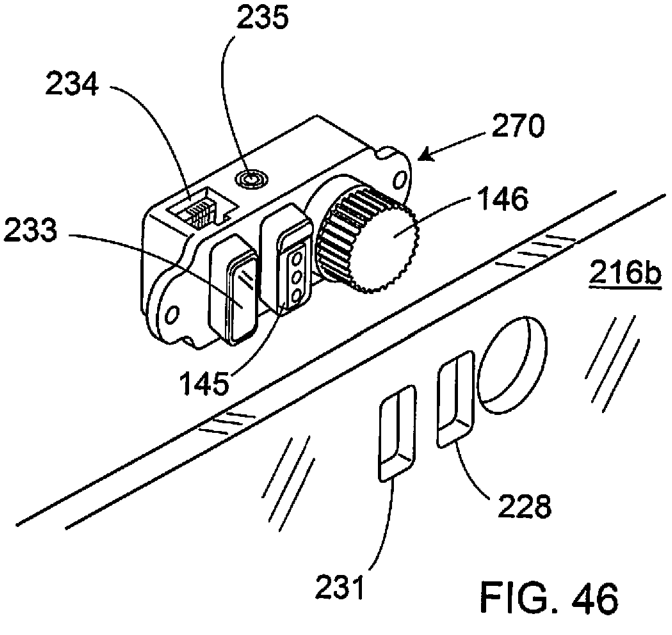
FIG. 46 is the same lock device shown in FIG. 39A but with the addition of a network antenna, network jack receptacle and external power port.

FIGS. 45 and 46 also show the lock device of the invention with an antenna 233 for wireless network connection. This connection may be an Ethernet connection or Bluetooth or similar connection or both. The lock units 260 and 270 shown in FIGS. 45 and 46 (similar to those of FIGS. 40A and 39A) are also equipped with a receptacle 234 for direct network connection (as an alternative to wireless) as well as a power receptacle 235 for external (line) power if required or desired. A network can be used to control what codes have access to a series of cabinets, drawers, etc. Such a network will include a terminal or central control system which can simply be a microprocessor with a database listing all locks. A laptop or hand held computer device is all that is required, or a network hub connected to a group of locks, wired or wirelessly.

With the central control a manager connects to any one lock or all locks when desired, to update which "keys" or codes will have access, and even the times of permitted access if desired. Each lock can include a processor to receive the control signal and to set the lock's electronics to allow access by employees A, B, C and D but not employee E, for example. This is changeable at any time, instantly. The programming and electronics for this networking and control function are well within the ability of a person of ordinary skill in the art. A panel hole 231 is provided for the antenna 233. A single panel opening could be provided for all projecting elements, or one for the antenna, one for all keys and the terminal 145, and one for the knob, or other similar arrangements. Note that the antenna and/or direct network receptacle, as well as the line power connection 235, can be included on any of the embodiments described above.

The locks of the invention, having the antenna 233, can have internally, connected to the antenna, a near-field communication (NFC) device that can communicate with a hand-held wireless device in proximity to the lock, for accessing the lock and also for purposes of lock settings and audit of lock access events. This near-field signal can be triggered to be activated by a smartphone (with appropriate programming, a phone app) or other portable electronic device, held close to the lock. The lock security and accessing of the lock could work in several different ways; the interrogation can be made either by the hand-held device or by the lock (with the lock having access to a database). One way is that the smartphone or other device must first authenticate the user, which could be by fingerprint, face recognition, voice recognition or simply a PIN. This will improve security. Upon authentication the hand held device can send an operating code to the lock. If the lock unit is not line powered but powered by batteries the user may "wake up" the lock by pressing a key on the lock prior to sending the code. The authentication and its method can be in accordance with the individual app and its objectives. A NFC capable hand-held device can send a signal containing the access code to operate the lock with or without prior authentication of the user of the hand-held device.

In another embodiment where the standalone lock unit either does not have a database of authorized codes or is not connected to a network for updating its database of valid codes, on authenticating the user the phone or hand-held device will send out a code asking for the lock's ID. This will "wake up" the lock, the electronics of which have been on a standby mode when not used, so as not to draw power (waking the lock could also require pressing a key on the lock's terminal, especially where the lock is battery-powered). On receiving the lock ID, the phone can, over the Internet or over a local network if desired, send the data of the user and the lock desired to be accessed, using the data connection of the phone. A database, which can be remote, will then send back an allowance or rejection code to the phone regarding this request for access. On receiving an allowance code from the access control database, the phone via its programming will transmit an access code to the lock, causing the lock to open. This protocol can also be used for updating the database of the lock if it has one. For audit purposes, the lock can then send a verification code back to the phone, if the lock was actually accessed. This code will be transmitted via the phone to the access control database.

A denial of access can also be transmitted to the access control database for audit purposes. If receiving a rejection code the phone app will inform the user that access was denied. In an NFC system a new employee, for example, not currently in the system, can have the employee's new code added to the system using the NFC device. The update can include whether the code is to be one-time access, permanent access, or limited access.

In a different operational protocol the lock can have an RFID reader that sends out an interrogating signal to a hand-held device or credential. Although such a credential could be a card containing an RFID tag, a smartphone can have a program or app that mimics an RFID tag transmitting an ID signal, or transmitting, receiving and calculating algorithms to authenticate the signal sent back by an RFID tag, in order to provide access. The sending of the code for access by the phone may be subject to prior user authentication as outlined above. In this case the access decision is provided by the lock electronics, rather than by the phone or other hand-held device, using database information as in the system described above.

Note that RFID and NFC are closely related wireless communication technologies, both used for a large number of applications including access control, asset and inventory tracking, etc. RFID was the precursor to NFC, and the range of frequency utilized in RFID has a frequency band in common with NFC. RFID involves unpowered tags capable of sending back a simple response to a reader, using the power of the reader's transmission. NFC operates at 13.56 MHz and is an extension of HF RFID standards. NFC is capable of more complex two way communication interactions and is thus more versatile in that respect than RFID. NFC is limited to communication at close proximity, such as 5 cm or less. Also, only a single NFC tag can be scanned at one time by a reader, whereas many RFID tags can be scanned simultaneously. NFC is available in a great many mobile phones or smartphones.

Figure 43:
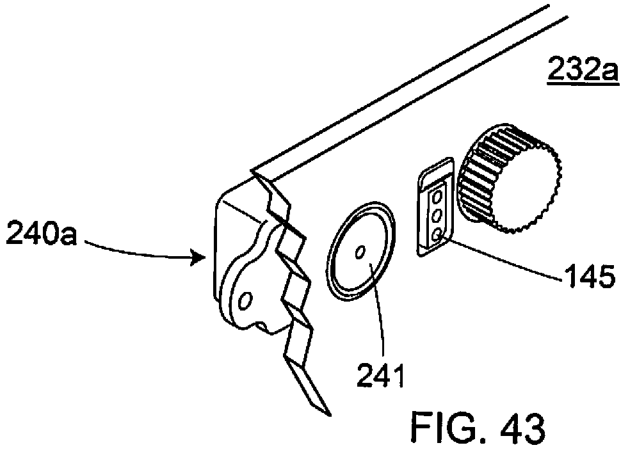
FIG. 43 is the same lock device shown in FIG. 41 but configured for mounting through the panel of a door, cabinet or drawer.
Figure 44:
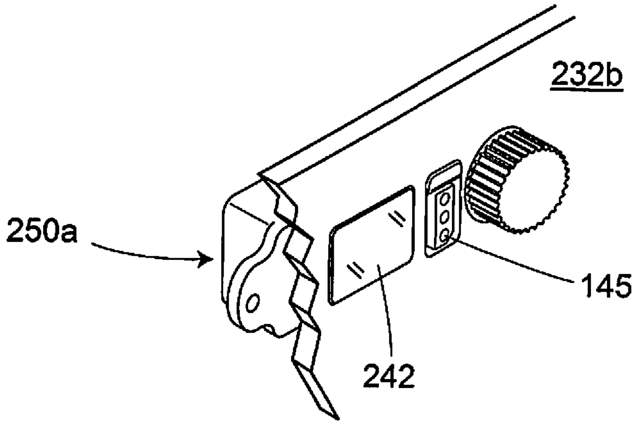
FIG. 44 is the same lock device shown in FIG. 42 but configured for mounting through the panel of a door, cabinet or drawer.

FIGS. 43 and 44 show panels 232*a* and 232*b* with lock devices 240*a* and 250*a* similar to those shown in FIGS. 41 and 42 but configured for installation through the panel of the door, cabinet or drawer. In this case the battery access will be from behind the lock device. The lock is mounted to studs on the panel through the mounting holes at each end or the unit may be mounted with screws or other fasteners directly to the panel from behind. Note again that common openings rather than individual holes can be provided in the panel for the knob, terminal, and input device.

Figure 47:
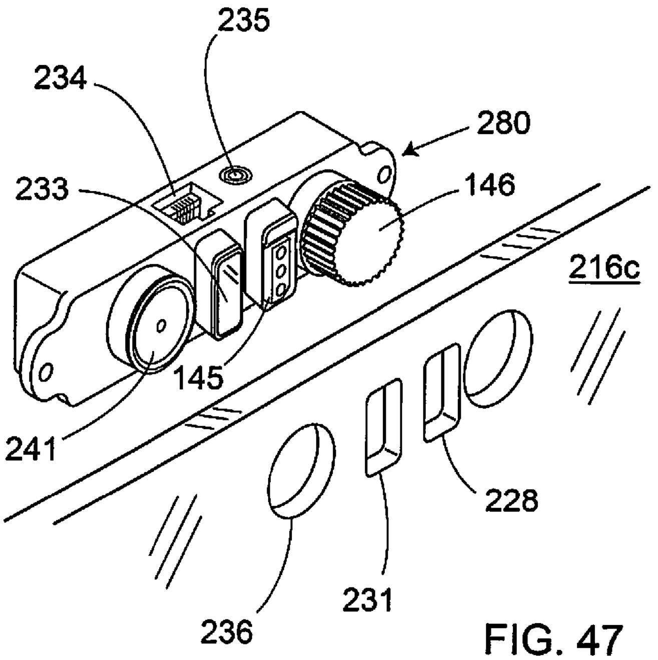
FIG. 47 is the same lock device shown in FIG. 43 but with the addition of a network antenna, network jack receptacle and external power port.
Figure 48:
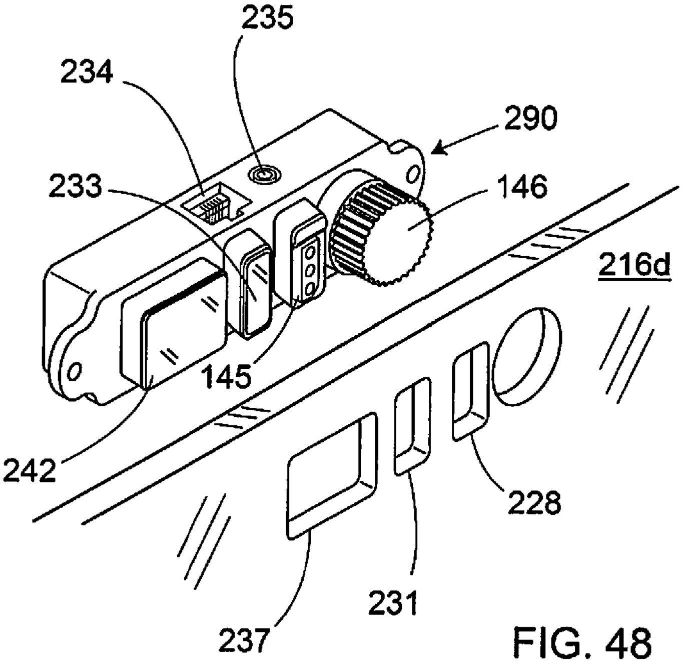
FIG. 48 is the same lock device shown in FIG. 44 but with the addition of a network antenna, network jack receptacle and external power port.

FIGS. 47 and 48 show through-the-panel lock devices 280 and 290 as shown in FIGS. 43 and 44 fitted with the same apparatus for network and power connections 234 and 235 (and antenna 235 if needed) discussed above for FIGS. 45 and 46.

FIGS. 49, 49A, 50 and 51 show, in flow chart/block diagram form, a package delivery and pickup system utilizing NFC-equipped locks and hand-held devices, as described above.

In such a preferred embodiment of the invention, the locks of the system may belong to different persons or require access decisions from the owner (or manager or agent) of the lock. In this arrangement when an NFC hand-held device (or Bluetooth or other close-proximity wireless protocol including BLE (Bluetooth Low Energy)) such as a cell phone tries to access the lock a message can be sent to the owner or agent through the app located in the NFC capable phone (or other portable NFC device or Bluetooth, etc.; the term "wireless proximity" device or "wireless proximity-enabled" device as used herein includes NFC, Bluetooth, BLE and other wireless protocols for short-distance communication), using the phone's cellular connection. The message can identify the person requesting access to the lock, and on approval or denial of access from the owner via the app in the owner's smartphone or other device, the lock then can approve or deny the access. The requested entry access or denial can be stored by the system or the lock or the phones or all of these for audit purposes. The term "smartphone" or "NFC phone" as used herein and in the claims and drawings is intended to include any "wireless proximity-enabled" device.

This arrangement can work well with home delivery systems. For example, the delivery companies such as UPS, Federal Express, U.S. Post Office, other common carriers, as well as local dry cleaners, grocery stores, etc. can be registered as delivery agents in a system and when they go to a location to make a delivery (or pickup) they can hold their registered phone with or without authentication and attempt to open the lock on the delivery box. If the phone belonging to the delivery person has been preauthorized to access the lock, the lock will open and if not, after reading the lock's information, the delivery person's phone will send out an access request from the phone's app (via cellular connection) to the owner of the lock and wait for a yes or no command. Based on the response the lock will open or deny access. If no answer is received from the owner or agent of the lock, the request will expire and this will be similar to the situation where no one is home for the delivery person. One alternative in that event is for the delivery agent to go to a public lockbox center at a later time and request authorization to deliver the package there, as further discussed below.

If the owner is anticipating a delivery (or pickup) he or she can preauthorize the access at the time of placing an order by checking an "access OK" box on the online order form which can be transmitted to the delivery agent's phone as a onetime access code for this specific delivery. The owner can also set one time, limited time or permanent access to known delivery agents/drivers from the list of delivery agents in the system.

Figure 49:
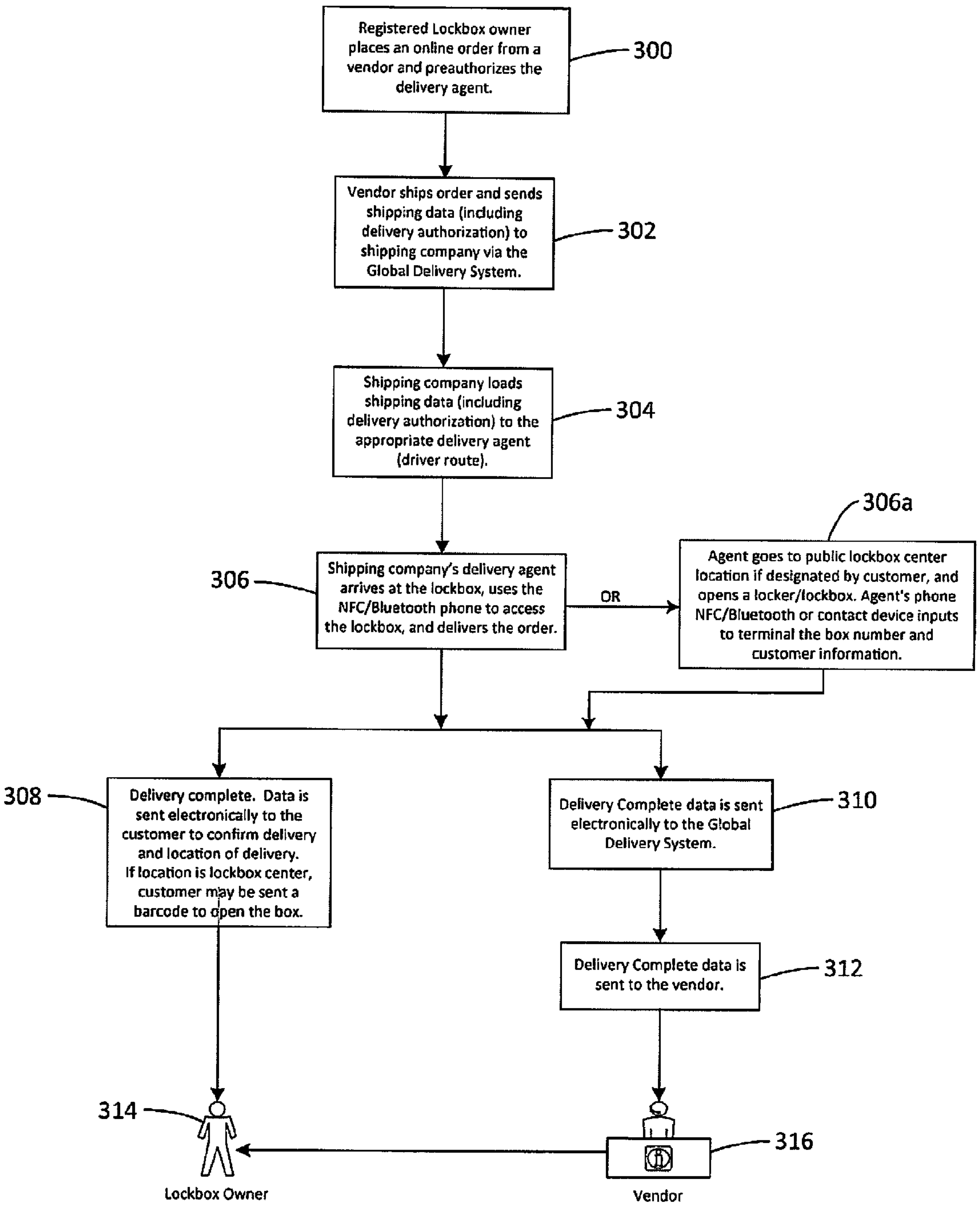
FIGS. 49 to 51 are flow charts and a block diagram indicating operation of a system and method of the invention for delivery of packages to blocked delivery boxes of customers, using locks of the invention.

As shown in FIG. 49, which illustrates the case of pre-authorized delivery to a system-registered owner's locked delivery box, the owner ("owner" or "customer" is understood to include an agent or manager of the locked delivery box, or anyone in a household or business authorized to use the lockbox) places an online order from a vendor of goods, and preauthorizes the delivery person to have access to the delivery box (the delivery person has already been registered in the system; preauthorization is different). This is shown in the block 300 in FIG. 49. The vendor fulfills the order and sends the shipping data, including the preauthorization, to the shipping company or carrier (UPS, Federal Express, etc.) via the global delivery system of the invention (block 302). As shown in the block 304, the delivery service transfers the shipping data, including the preauthorization, to the appropriate delivery person, i.e. driver. This goes into the delivery person's hand-held NFC device, which will usually be an NFC-enabled smartphone.

When the delivery person arrives at the customer's delivery box, as in the block 306, he/she uses the handheld NFC device to access the lock box, placing the package in the box and re-securing the box.

Following this, data confirming the completion of the delivery is sent electronically by the delivery person to the lock box owner, confirming delivery (block 308), and this data is also sent into the system of the invention (block 310), through which the information is sent to the vendor, as in the block 312. The drawing indicates the customer/lock box owner at 314, and the vendor at 316, with an arrow from the vendor to the lock box owner indicating that the vendor preferably sends an electronic message (e.g. email) to the customer confirming the completion of the delivery. The system itself, or simply the delivery company, could send this confirmation to the customer.

An alternative is shown in the block 306*a*, for a situation wherein the delivery person is unable to leave the package in the customer's lockbox. This could be because of a problem with the lockbox or some other problem that prevents the delivery agent from reaching the box. If authorized by the owner/customer, the delivery agent can take the package to a nearby lockbox center. Use of the lockbox center as an alternative delivery location could be preauthorized by the customer for any time needed or could be authorized for this instance by request using the agent's smartphone, provided a response is received. There normally will be a small charge per day for use of the lockbox center, to be automatically charged to the customer's credit/debit card via the system of the invention. The agent opens a lockbox and delivers the package, then inputs to the center's terminal the box number and customer information with other information about the delivery. The procedure then goes to the block 308. Note that the customer can be sent (by email or cell connection) a barcode for opening the box, along with the other information. Rather than a barcode or QRC code for scanning at the center, the customer can be sent a secure PIN code for entry on a keypad.

Figure 49A:
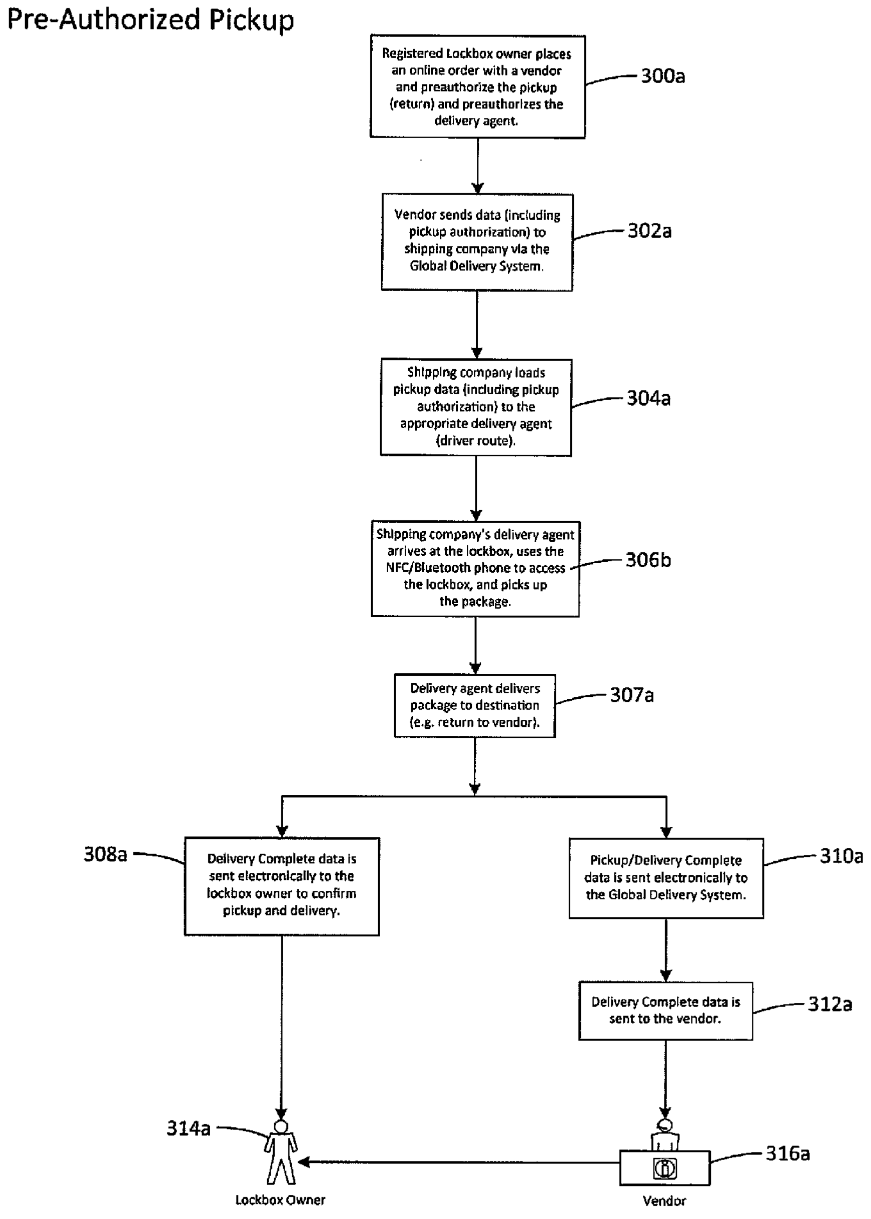

The block diagram of FIG. 49A is very similar to that of FIG. 49, but describes the series of steps for pickup of an article as requested by the lockbox owner, such as returning an item to the vendor. First the registered lockbox owner places an online order with a vendor for pickup of an item to be returned. This automatically preauthorizes a delivery agent to have access to the lockbox, which can be an authorization to authorize a delivery agent. This is shown in the block 300*a*, the reference numbers in FIG. 49A being similar to those in FIG. 49 except for the addition of an "a".

The block 302*a* shows that the vendor sends data, with pickup authorization, to a shipping company via the system of the invention. The shipping company, as indicated in block 304*a*, loads the pickup data including pickup authorization to the appropriate delivery agent. At 306*b*, the shipping company delivery agent arrives at the lockbox, using his NFC phone to gain access to the lockbox, and picks up the package. As shown at 307*a*, the delivery agent then delivers the package to its destination, which is typically a return to the vendor but can be other forms of delivery as explained below. The flow of tasks then proceeds in the same way as explained with reference to FIG. 49. Delivery complete data is sent electronically to the lockbox owner to confirm pickup and delivery of the package (blocks 308*a*, 314*a*). The data are also sent to the system of the invention (block 310*a*) which preferably forwards the information to the vendor (blocks 312*a*, 316*a*).

The system indicated in FIG. 49A can also be used for other pickups/deliveries which are not returns. In that case, a registered lockbox owner can arrange with a carrier (such as UPS or Federal Express) to have a package picked up and delivered to the desired address. The carrier will already be registered with the system. The order will be made by the owner electronically to the shipping company/carrier. The block 302*a* will not be involved in this scenario, but the remaining flow is essentially the same as in FIG. 49A except there will not be a vendor (block 312*a*, 316*a*).

Figure 50:
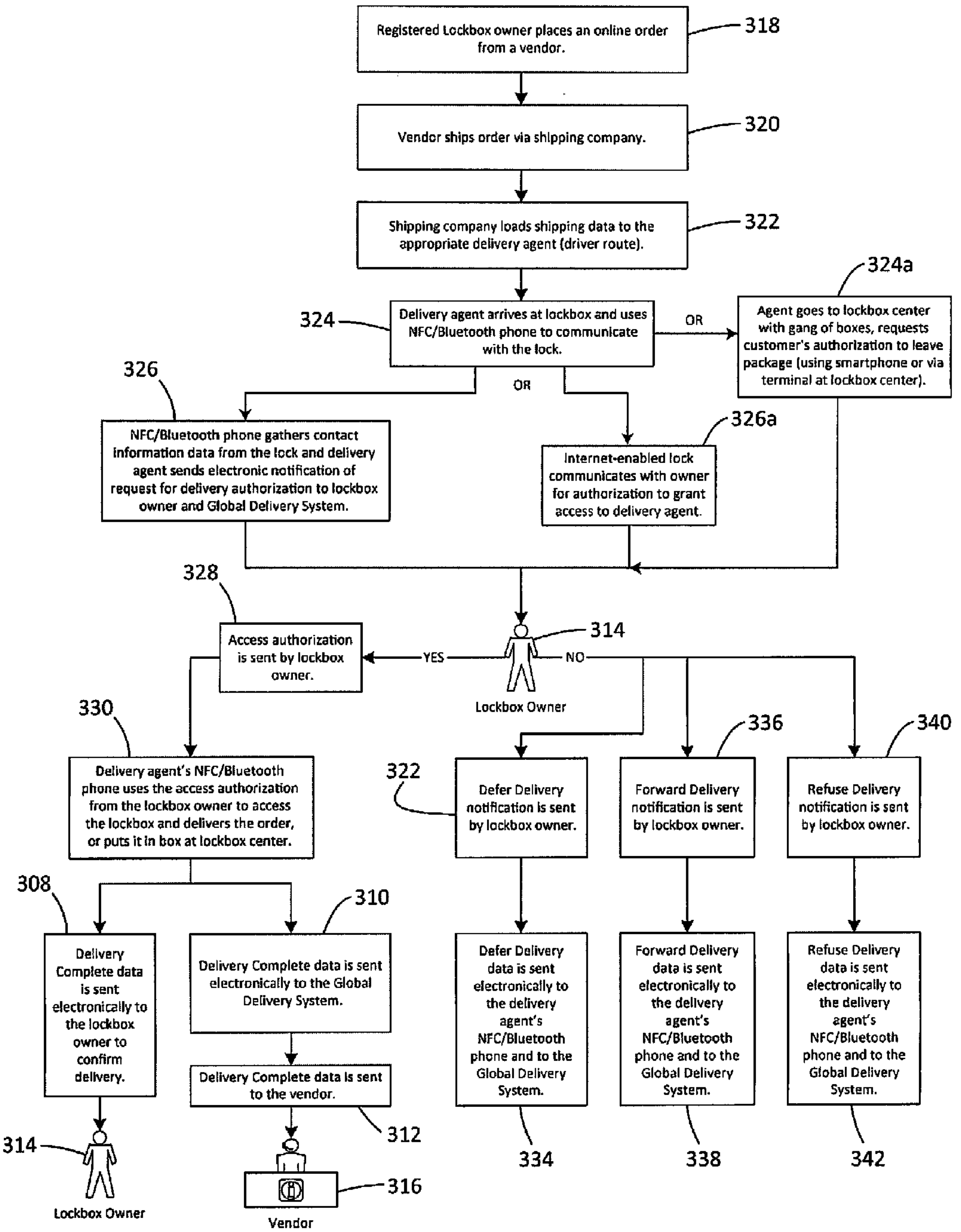

FIG. 50 shows in a flow chart the flow of information and events in the case where the delivery (i.e. access to a locked delivery box) has not been preauthorized. The block 318 indicates that a registered owner (or manager, agent, etc.) of a secure delivery box places an online order from a vendor. Note that in this case preauthorization is not made. The blocks 320, 322 and 324 are similar to the flow in the chart of FIG. 49, except that no preauthorization for delivery access is carried along with the shipping instructions/data. In the block 324, the delivery person arrives at the destination box and uses the NFC device to communicate with the lock, but this triggers an inquiry rather than opening the lock. The block 326 shows that NFC phone or device receives contact or ID data from the lock, including any required input from the delivery person, and sends an inquiry electronically, as by cell phone connection, to request delivery authorization from the lock box owner and from the system of the invention. The drawing schematically shows this as going to the lock box owner 314. The blocks 324*a* and 326*a* represent alternatives as explained below.

From there, procedure in the case of granted authorization is shown on the left, and in the case of denial of access, on the right. If access is authorized, the block 328 indicates authorization being sent by the customer/owner. Then the delivery person's NFC device uses this access authorization, i.e. a code, as generated from the customer/owner's granting of access, to open the delivery box and deliver the order (block 330). From this point, the procedure is the same as at the completion of the process shown in FIG. 49, and the blocks are similarly labeled.

If authorization to access the customer's delivery box to deliver the package at this time is denied, different scenarios are shown on the right side of FIG. 50. The block 332 indicates that the owner of the box has sent a deferred delivery notification back to the delivery person. In that case, the deferred delivery instruction is received in the delivery person's NFC device and it is also sent to the system, i.e. the data center of the system, as in the block 334.

Another possibility is that the box owner requests the delivery be made somewhere else, to a forward delivery location, as noted in the block 336. This is received in the delivery person's NFC phone and it also goes to the system data center, as in the block 338.

If delivery is refused by the box owner/customer (block 340), this data is sent to the delivery person's NFC device (block 342), and also to the system. The package will be returned to the vendor.

Another possibility is, as explained above, that an access decision response cannot be obtained from the box owner at the time the delivery truck arrives at the owner's delivery box. In this case, not shown in the flow chart, the delivery person simply tries again later.

Figure 51:
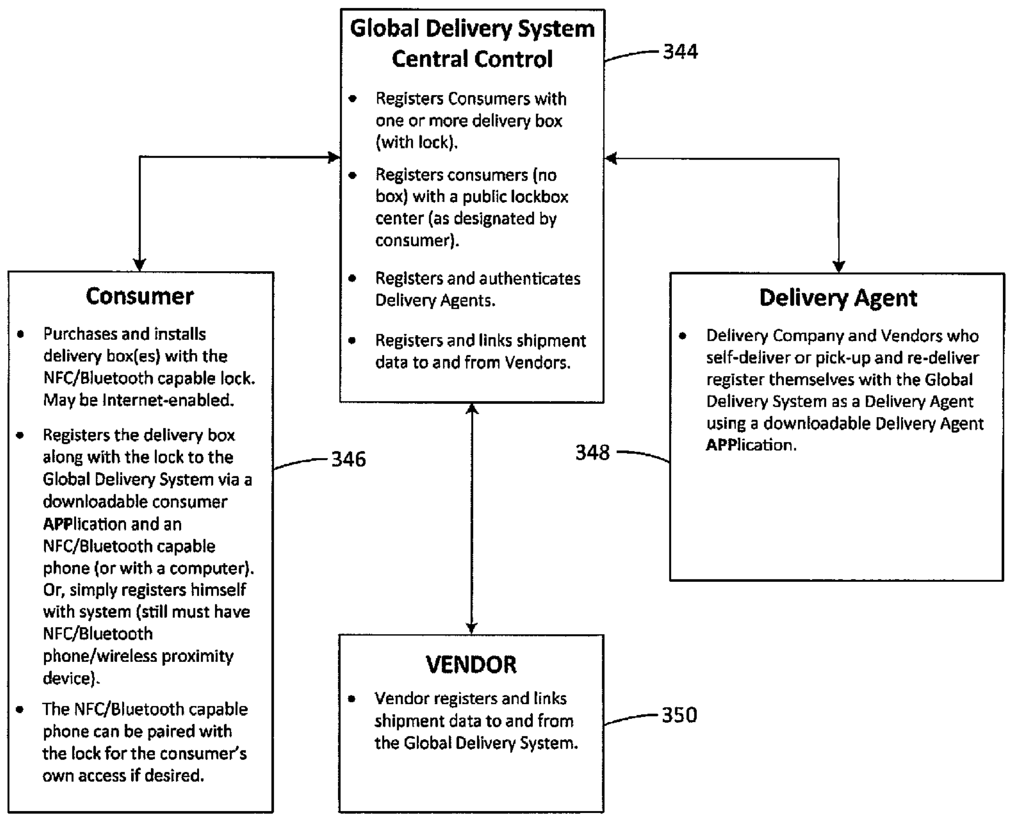

FIG. 51 schematically outlines the system of the invention, in a block diagram. The overall system includes all components in the diagram. The central control system, called "Global Delivery System" (block 344) in the diagram, has a database and enables the registration of consumers into the system, each consumer having one or more secure delivery boxes, the locks of which are registered with IDs. Customers without lockboxes can also be registered, with deliveries to be made at a public lockbox center. Further, the system registers and authenticates delivery personnel, normally the drivers of delivery trucks through their delivery companies (if any), so that their NFC phones or other devices are recognized by and authorized for use in the system. In addition, the system transfers data regarding an order and shipment to and from vendors, as explained above in FIGS. 49, 49A and 50, and receives information and authorizations from delivery box owners regarding access.

The block 346 relates to the consumer, i.e. the customer who receives packages in a secure delivery box. Initially, the consumer installs one or more delivery boxes with an NFC capable lock. The consumer then registers the delivery box and lock to the system of the invention (in the central control system) via a downloadable consumer application (e.g. smartphone app), with an NFC capable smartphone. The NFC capable phone is paired with the lock of the delivery box, i.e. it is associated with that lock in the system database. Alternatively, the consumer if without an NFC device can register the lock in another way, with a code of the lock entered into the central control system using a home computer, for example. Consumers without lockboxes can also register, as indicated. As noted in the bottom paragraph of the block 346, the consumer can use the paired phone for his/her own routine opening of the lockbox if desired (rather than using some other form of key).

The delivery company is indicated in the block 348. This is intended to include vendors who self-deliver or pick up packages, even small vendors such as laundry services or grocery stores that deliver. The delivery company registers itself with the system of the invention, and registers its individual drivers/delivery persons via their smartphones or other NFC capable devices, using a downloadable delivery person application.

The vendor block 350 shows that the vendor becomes registered in the system, and links shipment data from a customer's order to and from the system. The vendor also sends instructions to the shipping company, as noted in the diagrams of FIGS. 49 and 50, not shown in FIG. 51.

In a variation of the above system and process, or as an additional means of access decision communication when needed, the customer's lockbox is (for at least some customers) Wi-Fi enabled, capable of Internet communication. Communications regarding granting (or denying) access can then be done over the Internet, with direct communication between the lock and the customer (wherever the customer happens to be at the time). For example, the step 326 in FIG. 50 is replaced, as shown in the block 326*a*, with the lock's sending an electronic message to the customer identifying the delivery service (which is picked up by the lock in the previous step 324), and the customer's sending an instruction back to the lock to grant or deny access (the lock is opened, or the delivery agent is allowed to open the lock using the delivery agent's NFC phone; an LED on the lock can indicate granted or denied access). In this case there is no need to send access authorization to the delivery agent's phone—the lock can respond to the NFC phone/smartphone (properly identified electronically) when access has been granted by the customer. In FIG. 49 any communications with the customer/owner can be made via an Internet enabled lockbox rather than via the delivery agent's smartphone.

Note that this procedure can also be used for pickup as in FIG. 49A, in the event the delivery agent is not properly authorized to access the lockbox at the time he shows up. Further, it should be understood that the WiFi/Internet capability of the lock need not be normally active, but can be activated by the delivery agent's push of a button when he approaches. The same is true for the wireless proximity-enabled communication from the lock, which may be battery-powered.

Similarly, the lockbox need not draw constant power for other purposes, but can be active for communications only after a button is touched on the lock.

The customer/owner can also remotely schedule grants of access using Internet communication with the lock. For example, UPS could be pre-authorized for a designated day (or several days) to open the box and pick up a package.

As noted above, the "authorization required" procedure of FIG. 50 includes another alternative. The block 324*a* shows the delivery agent may request permission to leave the package at a lockbox center, especially if unable to get authorization at the customer's box. Authorization to use the lockbox center can be requested via the agent's smartphone or using electronic communication available at the terminal of the center. This is similar to the step 306*a* in FIG. 49 except that essentially contemporaneous authorization will always be required in FIG. 50. A small charge will be involved for use of the center's lockbox which can be automatically charged to the registered customer via the system. Again, a secure code, which could be a barcode, will be generated by the system and sent to the customer to enable opening of the box at the lockbox center.

The global delivery system, using locks as described above, thus makes more efficient the delivery of goods on behalf of customers who have secure delivery boxes.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A system for facilitating delivery of customer-ordered delivery packages to and pickup of collection packages from customers' secure delivery boxes, comprising:

a central control system, with a central database, a series of secure delivery boxes of potential delivery/pickup customers, each secure delivery box having a wireless proximity-enabled electronic lock, a series of vendors in electronic communication with the central control system, a series of different carriers for shipping delivery packages, the carriers being independent of the central control system and the carriers having delivery persons capable of delivering delivery packages to the secure delivery boxes of the customers, as ordered by customers from the vendors, and for retrieving collection packages from the secure delivery boxes of the customers as ordered by customers, each of the electronic locks of the secure delivery boxes being pre-registered with the central control system as an authorized location for delivery or pickup pursuant to the system, each of the vendors being system-registered with the central control system, each of the carriers and their delivery persons being system-registered with the central control system to make deliveries and pickups at the pre-registered secure delivery boxes of the potential customers, via wireless proximity-enabled handheld devices of the pre-registered delivery persons, which can engage in two-way communication at close range with the electronic locks and which can communicate electronically and remotely with potential customers, the wireless proximity-enabled handheld devices being pre-registered with the central control system, whereby the potential delivery/pickup customers maintain security in their delivery boxes, allowing access to the pre-registered secure delivery box by a pre-registered delivery person using a wireless proximity-enabled handheld device held close to the electronic lock of the pre-registered secure delivery box, for a delivery pursuant to an order made from a system-registered vendor by a customer, or an order made by the customer for pickup and delivery to another location, which can be via the system-registered vendor in the case of the customer's request to return an item to the system-registered vendor, and whereby, if the pre-registered delivery person's access to the secure delivery box has not been pre-authorized, the pre-registered delivery person can seek access using the wireless proximity-enabled handheld device, and when access is denied the wireless proximity-enabled handheld device can use contact information gathered from the electronic lock and any required input from the pre-registered delivery person and send an inquiry remotely and electronically to request access authorization from the customer, and the customer can then remotely send authorization and grant access to the pre-registered delivery person's wireless proximity-enabled handheld device, which can then be used to access the secure delivery box.

2. A system for facilitating delivery of customer-ordered delivery packages to and pickup of collection packages from customers' secure delivery boxes, comprising:

a central control system, with a central database, a series of secure delivery boxes of potential delivery/pickup customers, each secure delivery box having a wireless proximity-enabled electronic lock, a series of vendors in electronic communication with the central control system, a series of different carriers for shipping delivery packages, the carriers being independent of the central control system and the carriers having delivery persons capable of delivering delivery packages to the secure delivery boxes of the customers, as ordered by customers from the vendors, and for retrieving collection packages from the secure delivery boxes of the customers as ordered by customers, each of the electronic locks of the secure delivery boxes being pre-registered with the central control system as an authorized location for delivery or pickup pursuant to the system, each of the vendors being system-registered with the central control system, each of the carriers and their delivery persons being system-registered with the central control system to make deliveries and pickups at the pre-registered secure delivery boxes of the potential customers, via wireless proximity-enabled handheld devices of the pre-registered delivery persons, which can engage in two-way communication at close range with the electronic locks and which can communicate electronically and remotely with potential customers, the wireless proximity-enabled handheld devices being pre-registered with the central control system, at least some of the electronic locks being Internet-connectable, capable of obtaining a decision from a customer over Internet for grant or denial of access to a wireless proximity-enabled handheld device of a pre-registered delivery person seeking access, whereby the potential delivery/pickup customers maintain security in their delivery boxes, allowing access to the pre-registered secure delivery box by the pre-registered delivery person using the wireless proximity-enabled handheld device held close to the electronic lock of the pre-registered secure delivery box, for a delivery pursuant to an order made from a system-registered vendor by the customer, or an order made by the customer for pickup and delivery to another location, which can be via the system-registered vendor in the case of the customer's request to return an item to the system-registered vendor, and whereby, if the pre-registered delivery person's access to the secure delivery box has not been pre-authorized, the pre-registered delivery person can seek access using the wireless proximity-enabled handheld device, and when access is denied the Internet-connected electronic lock of the customer can communicate with the customer and obtain the decision from the customer over Internet for grant or denial of access to the wireless proximity-enabled handheld device of the pre-registered delivery person.

* * * * *